(12) United States Patent
Arnaud et al.

(10) Patent No.: US 6,808,693 B2
(45) Date of Patent: Oct. 26, 2004

(54) METHODS AND APPARATUS FOR INCREASING AND EXTENDING OIL PRODUCTION FROM UNDERGROUND FORMATIONS NEARLY DEPLETED OF NATURAL GAS DRIVE

(75) Inventors: Johnny Arnaud, Houston, TX (US); B. Franklin Beard, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 60 days.

(21) Appl. No.: 10/317,009

(22) Filed: Dec. 11, 2002

(65) Prior Publication Data

US 2003/0168211 A1 Sep. 11, 2003

Related U.S. Application Data

(63) Continuation-in-part of application No. 09/879,496, filed on Jun. 12, 2001, now Pat. No. 6,669,843.

(51) Int. Cl.[7] .............................. C09K 7/00; E21B 21/00
(52) U.S. Cl. ...................... 423/212; 422/168; 422/182; 422/291; 175/71; 166/68; 166/75.11; 166/266; 166/302; 166/372; 166/401; 48/61
(58) Field of Search .................. 423/212; 422/168, 422/182, 291; 175/71; 166/68, 75.11, 266, 302, 372, 401; 48/61

(56) References Cited

U.S. PATENT DOCUMENTS

| | | | |
|---|---|---|---|
| 2,735,547 A | 2/1956 | Vissac | |
| 3,289,608 A | 12/1966 | Laval, Jr. | |
| 3,447,511 A | 6/1969 | Beard et al. .................. 123/3 |
| 3,507,397 A | 4/1970 | Robinson | |
| 3,512,651 A | 5/1970 | Laval, Jr. | |
| 3,568,837 A | 3/1971 | Laval, Jr. .................. 210/136 |
| 3,947,364 A | 3/1976 | Laval, Jr. | |
| 4,024,912 A * | 5/1977 | Hamrick et al. ............... 48/61 |
| 4,237,006 A | 12/1980 | Colman et al. | |
| 4,330,038 A * | 5/1982 | Soukup et al. ............... 166/267 |
| 4,790,942 A | 12/1988 | Shmidt et al. ............... 210/650 |
| 5,000,848 A | 3/1991 | Hodgins et al. ....... 210/321.68 |
| 5,021,165 A | 6/1991 | Kalnins ....................... 210/703 |
| 5,071,542 A | 12/1991 | Tuszko et al. | |
| 5,131,757 A | 7/1992 | Smith | |
| 5,362,395 A | 11/1994 | Dorau et al. ................. 210/638 |
| 5,435,975 A * | 7/1995 | Bastos ........................ 422/168 |
| 5,451,349 A | 9/1995 | Kingsley ..................... 261/91 |
| 5,478,484 A | 12/1995 | Michaluk .................... 210/788 |
| 5,647,977 A | 7/1997 | Arnaud ....................... 210/167 |
| 5,794,791 A | 8/1998 | Kindig ......................... 209/727 |
| 5,882,530 A | 3/1999 | Chase ......................... 210/788 |

(List continued on next page.)

FOREIGN PATENT DOCUMENTS

GB 2174984 A * 11/1986 ........... E02B/15/04

OTHER PUBLICATIONS

Filtration News™, vol. 22, No. 1, Jan./Feb. 2004, Flowmatic Roberts W Chin.
Rob Schack, Developing of on Inline Deliguidisen, pp. 20, 22 and 25.
"Fundamentals of *General Chemistry*", C. H. Sorum, University of Wisconsin (undated).

(List continued on next page.)

*Primary Examiner*—David A. Reifsnyder
(74) *Attorney, Agent, or Firm*—Howrey Simon Arnold & White, LLP

(57) ABSTRACT

Methods and apparatus employing inert gases injected into the lower level of sloping underground oil-bearing formations as a driving mechanism and water injected into the upper level of the formations as a gas blocking mechanism for increasing and extending the production of oil from underground formations is described. Also described is an inert gas oil production system comprising an exhaust gas processing system, a well inert gas and water injection system, an oil production well system, and a fuel gas generator. A hydraulically operated crude oil pump is also described.

40 Claims, 26 Drawing Sheets-

U.S. PATENT DOCUMENTS

| | | | |
|---|---|---|---|
| 5,944,998 A | 8/1999 | Rolchigo et al. | 210/654 |
| 6,017,198 A | 1/2000 | Traylor et al. | 417/390 |
| 6,024,874 A | 2/2000 | Lott | 210/512.1 |
| 6,032,931 A | 3/2000 | Plunkett | 261/77 |
| 6,080,317 A | 6/2000 | Wagner et al. | 210/652 |
| 6,106,713 A | 8/2000 | Miller et al. | 210/321.63 |
| 6,165,365 A | 12/2000 | Salyer et al. | 210/650 |
| 6,168,724 B1 | 1/2001 | Hurwitz | 210/780 |
| 2003/0173275 A1 | 9/2003 | Arnaud | 210/143 |
| 2003/0173276 A1 | 9/2003 | Arnaud | 210/143 |
| 2003/0173288 A1 | 9/2003 | Arnaud | |
| 2004/0031742 A1 | 2/2004 | Arnaud | 210/259 |

OTHER PUBLICATIONS

"Chemical Calculations An Introduction to the Use of Mathematics in Chemistry", Sidney W. Benson, University of Southern California (undated).

"Fluid Mechanics with Engineering Applications", R. L. Daugherty, California Institute of Technology, 1954.

"Equipment and Applications for Industry", Claude Laval Corporation (undated).

"Industrial Process Problem Solving . . . Solids/Liquids and Liquid/Liquid Hydrocyclones for Separation, Classification, and Dewatering", ©1995 Krebs Engineers.

Demco Cyclone Separators Catalog C1–78. Aug. 15, 1978.

Geosource® The Pioneer in solids/liquid separation, 1979 Catalog.

Hydrocyclones Problem Solving in Liquid/Solids Separation, Picenso International Inc. (undated).

"Facts and liquid cyclones, Where to use them, Where not to use them. And how to specify the right cyclone for the job, With special emphasis on The Dorrclone®"; © 1979 Dorr–Oliver Incorporated.

"Porous Plastics" Porex®, ©1998 Porex Technologies Corp.

"Nitroxy Siliporite® Molecular Sieves for Medical Oxygen Concentrations" CESA, (no date).

"New Trends in Air Separation Adsorbents" by Marie–Theres Grandmougin, et al.; CECA, France (undated).

"Clarifying Oilfield and Refinery Waste Waters by Flotation;" Journal of Petroleum Technology, pp. 426–430, dated Apr. 1973.

"Membrane Bioreactors for Wastewater Treatment;" by Tom Stephenson, et al.; dated 2000. reprinted 2001.

"New Developments in High Shear Crossflow Membrane Filtration;" Fluid/Particle Separation Journal, pp. 123–138, vol. 4, No. 1, Mar. 1991.

"The Application of Dermulsification Chemicals in Recycling, Recovery and Disposal of Oily Waters;" Sam Delchad, Ph.D., Emulsions Control Inc. California (no date).

EPA Technical Bulletin, EPA 456/F–99–006R; "Nitrogen Oxides (NOx), Why and How They Are Controlled;" Nov. 1999.

"Superior Nitrate Removal for Treatment Plants and the Home;" Sybron Chemicals Inc.; IONIC© SR–7 Advanced anion Exchange Resin. (undated).

Solicitation for Financial Assistance Applications No. DE–PS26–02NT41613; "Development of Technologies and Capabilities for Developing Coal. Oil and Gas Energy Resources;" p. 55, "3.Gas Flooding", (undated).

* cited by examiner

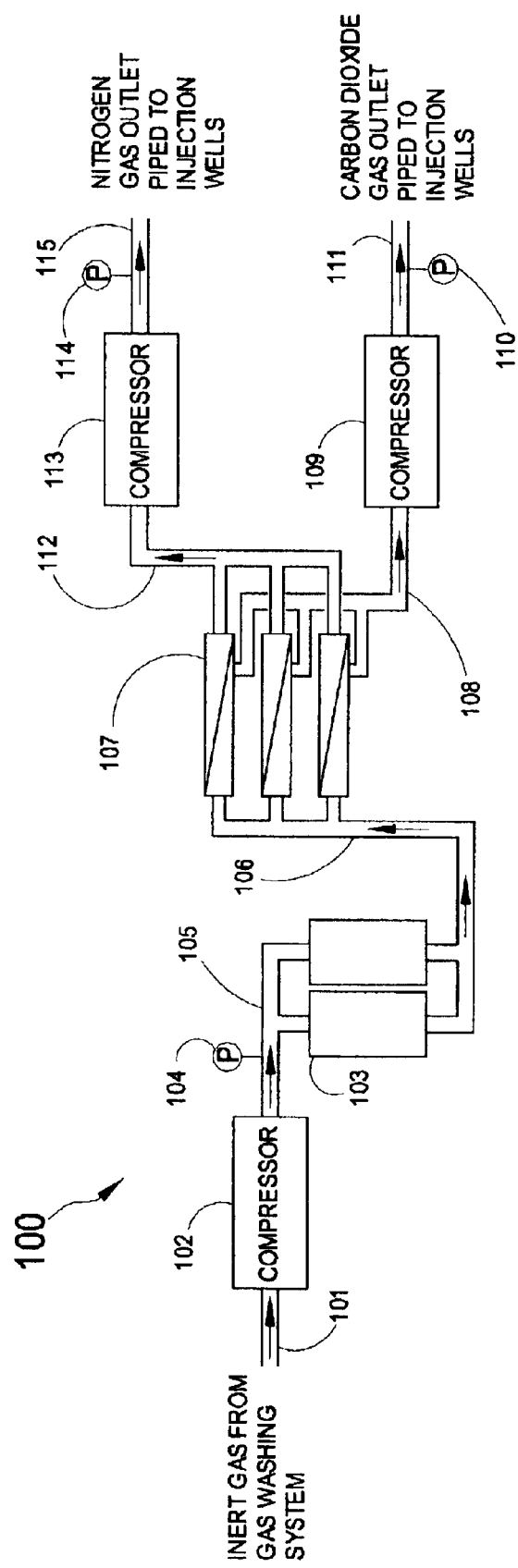

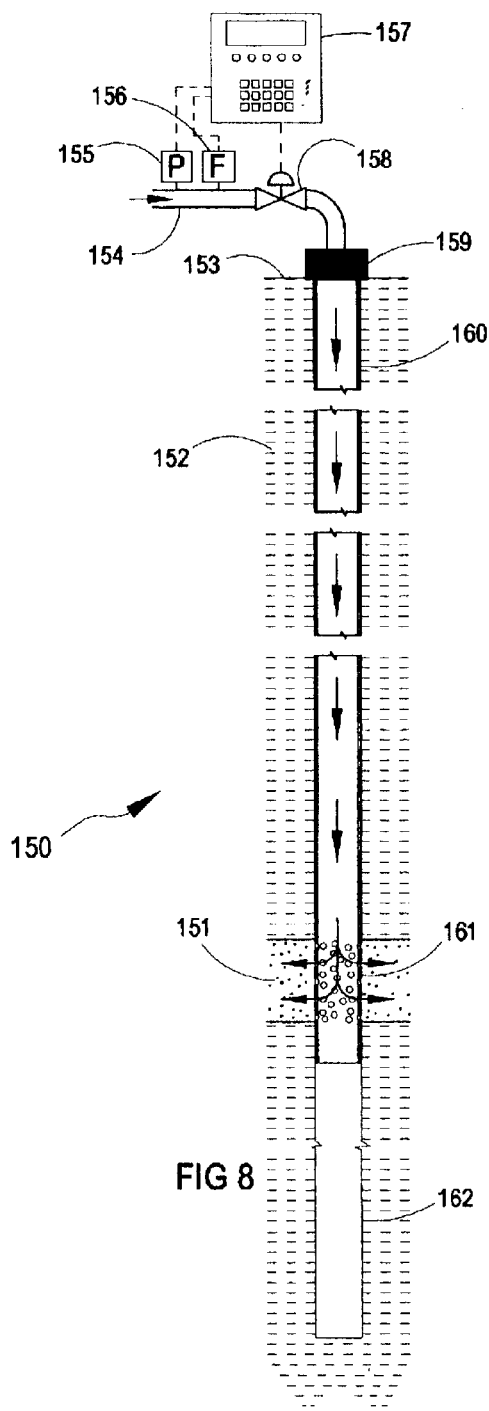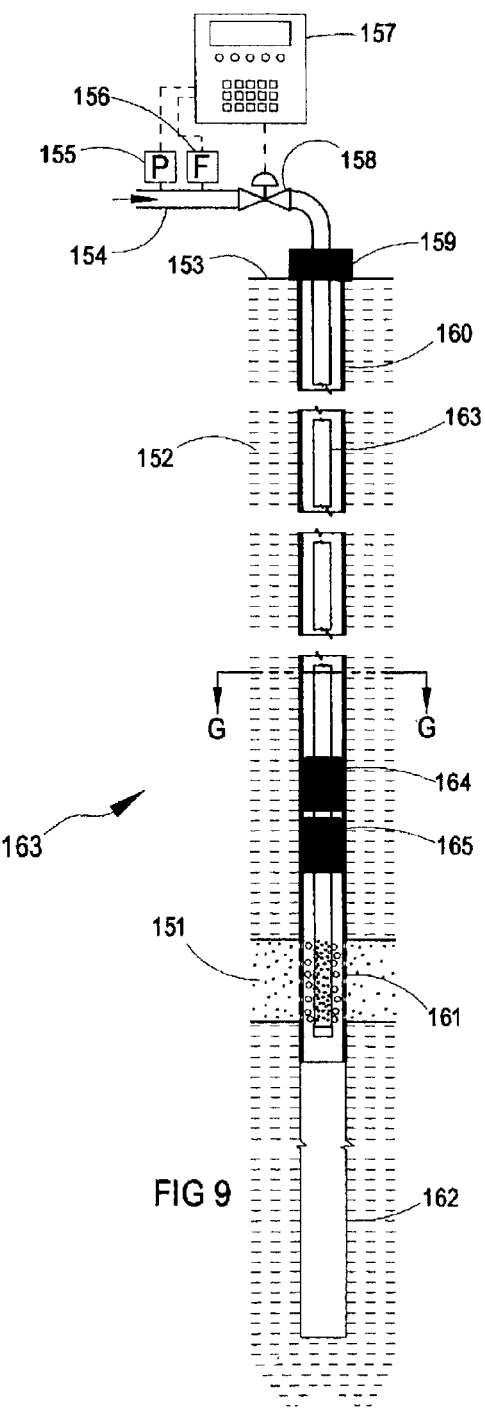

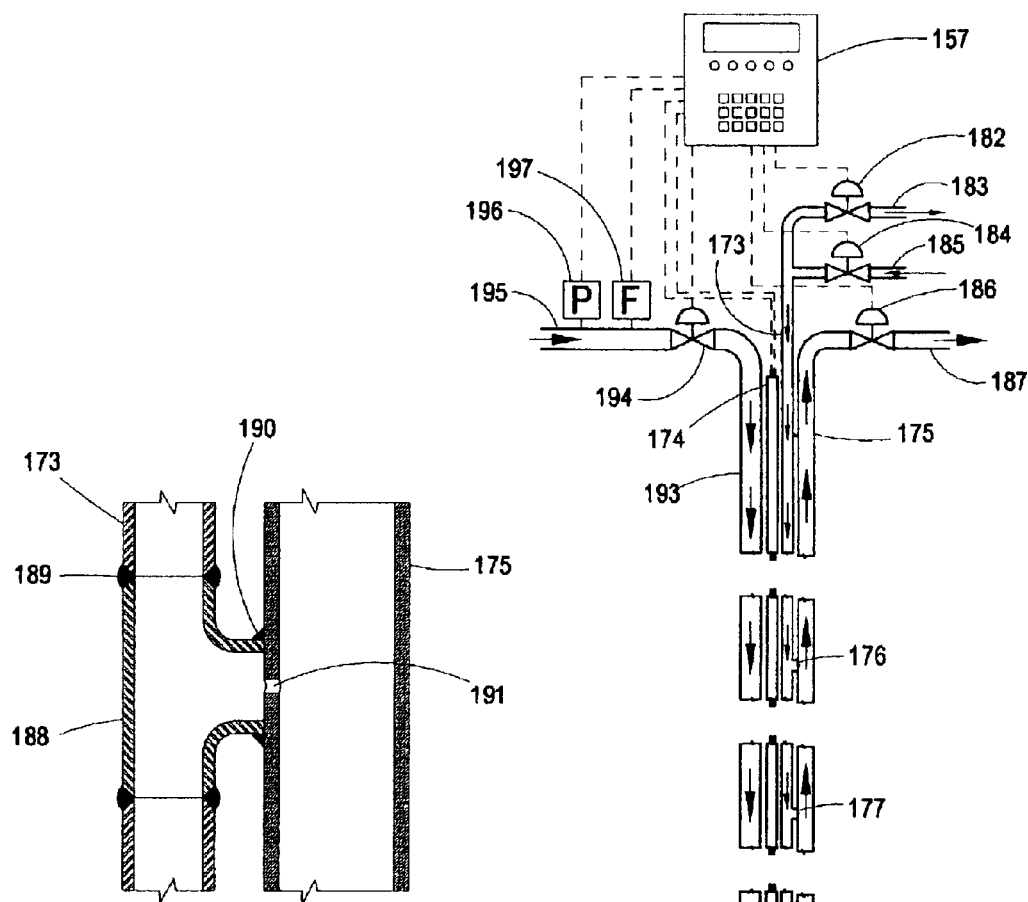
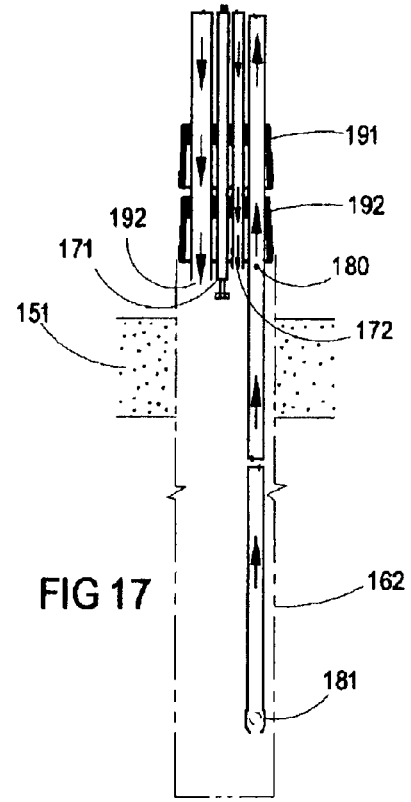
FIG 16
FIG 17

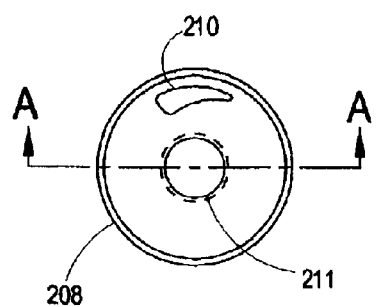
FIG 20
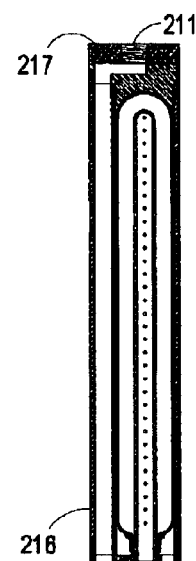
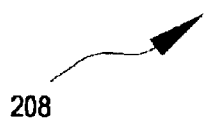
FIG 21

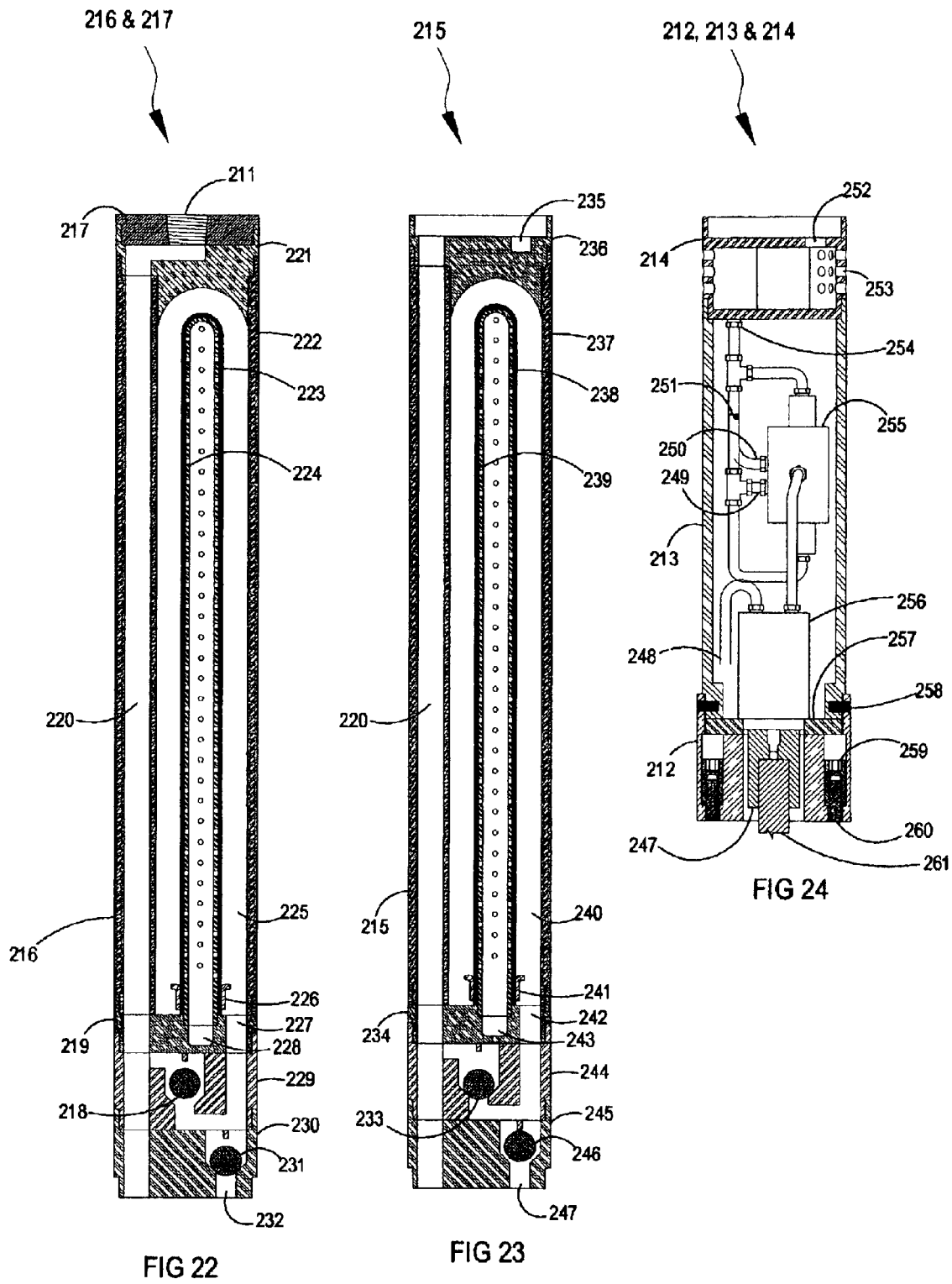

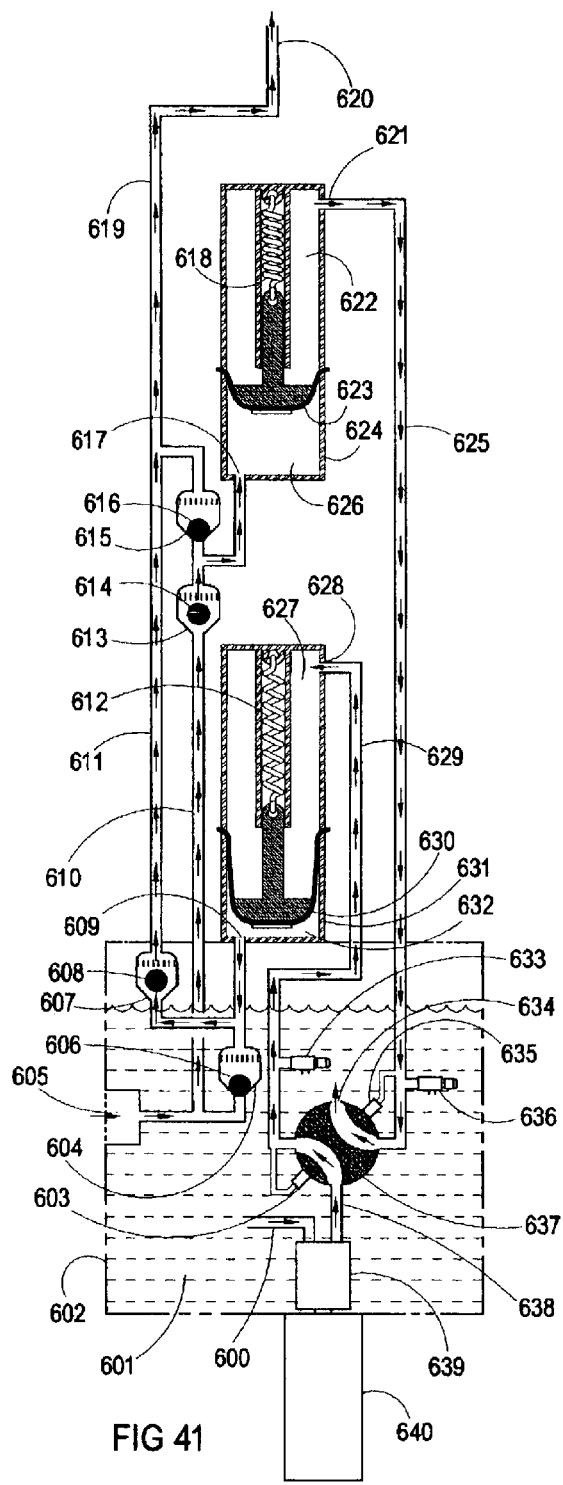
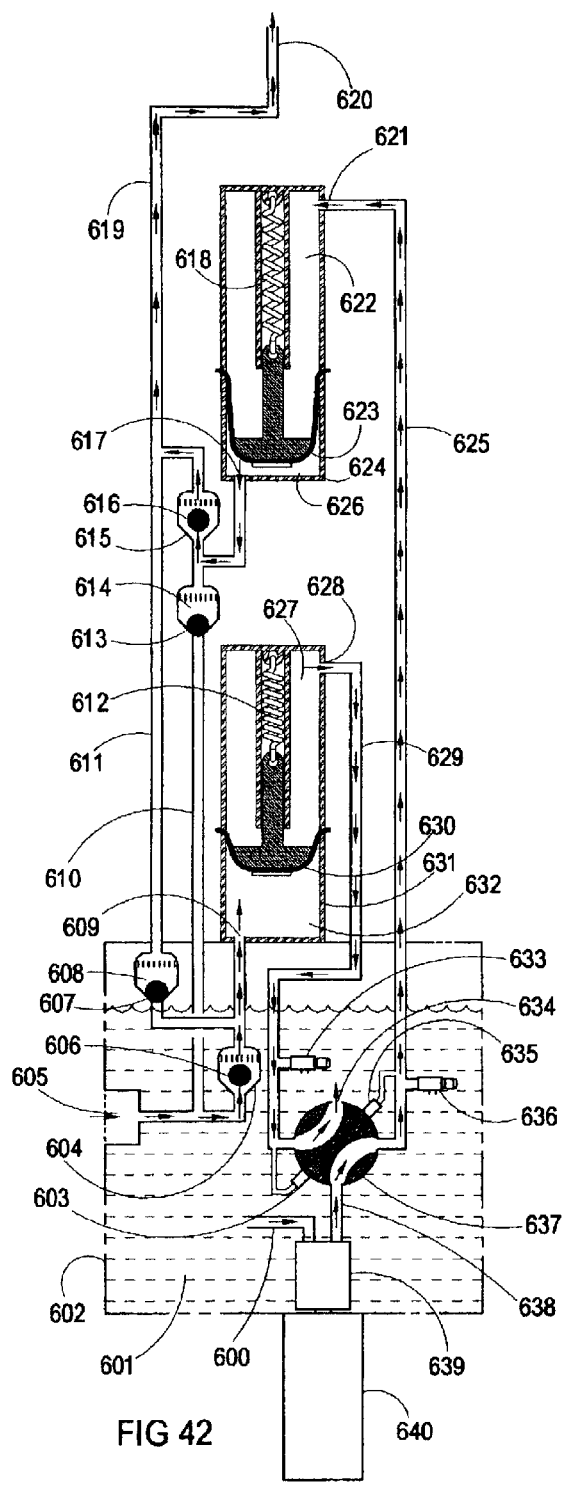
FIG 41
FIG 42

METHODS AND APPARATUS FOR INCREASING AND EXTENDING OIL PRODUCTION FROM UNDERGROUND FORMATIONS NEARLY DEPLETED OF NATURAL GAS DRIVE

CROSS REFERENCE TO RELATED APPLICATIONS

This application is a continuation-in-part of patent application Ser. No. 09/879,496, filed Jun. 12, 2001, now issued as U.S. Pat. No. 6,669,843, entitled "Method and Apparatus for Mixing Fluids, Separating Fluids, and Separating Solids from Fluids," by Johnny Arnaud, which is hereby incorporated by reference in its entirety.

BACKGROUND OF THE INVENTION

1. Field of the Invention

The present invention relates to methods and apparatus employing inert gases injected into the lower level of sloping underground oil bearing formations as a driving mechanism and water injected into the upper level of the formations as a gas blocking mechanism for increasing and extending the production of oil from underground formations nearly depleted of natural gas as a driving mechanism.

2. Description of Related Art

During geologic times marine animal and vegetable remains collected in ocean basins and were covered by the accumulation of eroded sand and sediment. Over millions of years the organic matter in those saltwater basins changed to what would become oil and gas. The weight of the layers of material that accumulated on top of the sand beds and the high density of the saltwater caused a high pressure to form in the oil and gas basins. Seawater flowing in subterranean strata and other natural forces added to this pressure and caused the oil and gas to flow upwards out of the buried basins. The oil and gas then migrated with the flowing saltwater in the permeable layers of material below the impervious layer serving as a cap rock until captured by anticlines, faults, stratigraphic traps, and other subsurface formations.

Along the coast of the Gulf of Mexico and other areas large bodies of salt penetrated the strata from far below the surface to create domes that could even be seen above the surface in many places. The actions of the salt left porous layers of rock turned upward against the impervious salt, formed pockets in the cap of the domes, and caused faults in the strata above or surrounding the domes to trap the migrating oil and gas. The origin of the salt has yet to be fully understood. Some believe that alone the Gulf Coast of the United States the salt may have originated from the thick horizontal layer of salt that starts on-shore near the northern Texas Coast and extends out for many miles below the waters of the Gulf of Mexico just off the Louisiana Coast. A similar origin is believed in other areas. Oil production on-shore along the Gulf Coast is often around the salt domes as well as many other formations. Similar oil and gas reservoirs are found universally.

In the early part of the industry, before the technological advancements in exploration and drilling that exist today, oil production was from wells drilled into shallow formations. Methane gas above and entrained in the oil maintained the underground pressure and displaced the oil up the wells to the surface. The gas in those earlier fields has long been taken off to provide fuel for homes and industry. Soon after came the installation of the familiar pumps (called "pump jacks") towering above the ground with the cyclic movement of the giant rocking arms as they lift the oil to the surface. Water and steam pumped down into the oil-bearing formations under ground as a driving mechanism (water and steam flooding) has received a limited amount of success for extraction of additional oil from certain fields. Many of those fields are now mostly depleted of the oil considered to be recoverable. However, it is well understood by those in the industry that in most oilfields more oil remains in oil formations than the amount removed by the previous technology available, perhaps enough to greatly reduce the United States' dependency on foreign oil for some time in the future if production can be recovered. If a new method is successfully demonstrated, the production from existing fields could be almost immediate and at relatively low cost because the location of the fields are known, the formations from which the oil is produced is well understood, and many of the abandoned wells are already in place with minimum effort required for placing them back into production.

The method employed in this invention is to use inert gases produced by the combustion of methane or propane gases as a driving mechanism. The products of combustion are also generally referred to as "flue gases." There have been a number of attempts to extend oil production in oilfields considered to be depleted of the readily recoverable oil by injection of inert gases into the oil bearing formations as a driving mechanism that have failed. A second problem experienced in the attempts at inert gas injection was the corrosive effects of flue gases on the equipment and piping both above and below ground. The present invention overcomes the deficiencies of previous methods and apparatus by removing the corrosive contaminants in the flue gases and controlling the direction of flow of the inert gases once injected into the underground formations. The key to the success of extending oil production by inert gas injection in a formation considered depleted of recoverable oil is the addition of a method of controlling the flow path or direction the gases have a tendency to take. The general approach over an entire production zone is to inject the inert gases into the lower level of the inclined oil sand (down dip) to drive the oil up the formations and prevent the gases from escaping by pumping water into the upper part of the oil sand (up dip) to drive the oil in a downward flow to intercept the oil being driven upward by the injected inert gases. The heavier water will block most of the gases from overrunning the oil and escaping out of the production zone.

Injecting the lighter gases through selected injection wells at the lower end of a formation and the heavier compatible water from selected wells in the upper end of that formation will increase the pressure in the formation between the injection points and drive the oil to selected production wells positioned between the two levels of injection to collect the oil and bring it to the surface. The compressible inert gases will maintain a higher formation pressure between the injection wells and keep the oil flowing to the production wells for a period of time after the gas injection is temporarily discontinued. In addition, apparatus designed to reduce costs of oil recovery have been incorporated into the oil production system including small and new crude oil production pumps to replace the large and expensive pump jacks currently used and make it economically feasible to produce even one-quarter barrel of oil per day from a well and a fuel gas generator to extract natural gas from the crude oil under production for operation of the internal combustion engines used to power compressors and electrical generators in the production field.

The inert gases are produced by powering a compressor with an internal combustion engine in the production field or obtained from the combustion flue of a nearby industry. Air is added to the combustion process, and as a result for one theoretical cubic foot ($ft^3$) of methane fuel the volume of combustion products produced include 1 $ft^3$ of carbon dioxide ($CO_2$), 2 $ft^3$ of water vapor ($H_2O$), and 7.55 $ft^3$ of nitrogen gas ($N_2$). For propane fuel the volume of combustion products produced include 3 $ft^3$ of $CO_2$, 4 $ft^3$ of $H_2O$, and 18.87 $ft^3$ of $N_2$. The carbon dioxide and nitrogen gases constitute the inert gases obtained from the flue gases. In addition, nitrogen oxides are also produced and must be removed from the inert gases before injecting them into the underground formations to prevent extensive corrosion of the equipment. The exhaust gases are cooled and washed to remove the combustion water vapors and nitrogen oxides. The clean inert gases of carbon dioxide and nitrogen are then injected into the underground oil formations through existing wells. Following an initial period of injection required for gradually increasing the pressure in the formation, substantial oil either flows or is pumped out through adjacent wells or the injection of the inert gases is discontinued, and oil is allowed to flow back to the well into which the gases were injected when the huff and puff method is applied. The injection of gases into a well and production of oil from an adjacent well is referred to as the "flow through production" method of inert gas production. The injection of gases into a well to increase the pressure in the formation then allowing that pressure in the formation to force the oil to flow back to that same well is referred to as the "huff and puff," or the "cyclic injection and production" method of inert gas production. In most instances, the specific method used is dependent on the viscosity of the oil being produced.

Saltwater brought to the surface with gas and oil from underground production wells is commonly referred to as "produced water." The present invention relates to underground production formations where the natural gas has been nearly depleted; therefore, the produced water will be brought to the surface combined with some remaining gas and the oil. The produced oil and water are typically placed into large tanks (often referred to as "gun barrels" in the industry) and allowed to separate by gravity. Although the oil is transported to refineries, the produced water becomes a waste product. However, in the methods employed by the present invention the produced water becomes a valuable commodity to be filtered and injected into the same underground formation from which it originates to act as a blocking mechanism to prevent the injected gases from escaping and direct the flow of the gases driving the oil to the production wells.

Shallow oil producing formations frequently contain oils with higher viscosities than the deeper wells where the volatile products may not generally escape. The viscosity of heavy oils can be reduced by absorption of carbon dioxide ($CO_2$). Where it is determined from laboratory analysis that the reduction of oil viscosity of the oil in the underground formations would be economically beneficial to the production process, carbon dioxide can be separated from the nitrogen gas to nearly 100 percent of the—injection gases to reduce the viscosity of heavy oils. The nitrogen gas can be released to the atmosphere, transported to other oilfields for injection, or used for injection in another part of the oil formation under production as a driving mechanism when the carbon dioxide gas has reduced the heavy oil viscosity. Membranes may be used to separate the nitrogen from the carbon dioxide in flue gases. The membranes are typically employed for production of nitrogen gas with air as the source of nitrogen. The membrane used are assemblies of many thousands of hollow polymeric fibers each approximately the size of a human hair with the inside surface treated to produce a thin film on the inside surface that actually becomes the membrane that allows oxygen molecules to flow through the membrane and reject the larger nitrogen molecules. The porous material below the membrane surface serves as a support. The membranes also allow other gases with molecules smaller than that of nitrogen to flow through and be separated from the nitrogen gas. The result is for pure nitrogen to be separated from all other gases, including water vapors, in atmospheric air. In applications other than oil production the nitrogen is collected and stored, with the gases other than nitrogen typically discharged to the atmosphere. For injection into a heavy oil formation the flue gases can be separated for concentration of carbon dioxide where it is beneficial and economically feasible to do so. The normally discarded gases that flow through the membranes become the product to be collected for injection into the underground heavy oil formation.

The boundaries of the productive formations in existing oil fields were defined in the development and planning phases following the discovery of oil in those areas. The location and spacing of wells on a particular formation was based on the specific structure of the formation and on the number of different operators on the field attempting to achieve maximum oil production. Regardless of how well spacing was originally determined, detailed records of what was accomplished were kept and can be used as a reference to establish a general approach to additional production in specific fields. The structure of the formations, the spacing and location of the wells, and the viscosity of the oil to be produced will determine which wells are selected for inert gas and water injection and the specific method of either flow-through production or cyclic injection and production (huff and puff) from each well.

With the natural gas nearly depleted over the oil in the underground formations where the oil production is to occur methane for engine fuel may not be readily available in the oilfields. The cost of a natural gas (methane) pipeline or the trucking of propane to some of the oilfields may be substantial. In those fields the fuel gas might be economically extracted from the crude oil produced in those oilfields by a fuel gas generator. The gas extracted from the crude oil can be used as fuel for the engines that power compressors, and for other engines that power generators to supply electrical power for pumps, cooling tower fans, controllers, and area lighting where electricity is not readily or economically available, or for competitive cost advantage over other methods of producing oil from nearly depleted formations.

SUMMARY OF THE INVENTION

The present invention provides a new method and apparatus for increasing the rate of production and the total amount of oil that can be extracted from underground formations nearly depleted of natural gas as a driving mechanism by injecting inert gases as the oil driving mechanism with water as a gas blocking mechanism to increase the subterranean pressure and drive the oil to production wells where it can be brought to the surface.

An apparatus in accordance with the present invention may generally employ an oil production system using inert gases injected into the underground formation as the driving mechanism and produced water as the blocking mechanism to force the oil to production wells where it can be brought to the surface. The apparatus employs exhaust or flue gases from an engine used in the system or from a nearby industry, a fuel gas generator for extracting natural gas from the crude oil under production to operate the engines used to power compressors and electrical generators used in the process, an exhaust gas cleaning system to remove the corrosive contaminants from the gases to be injected underground, produced water from the formation under production, a well injection system to deliver the gases and water to the underground formation under production, a well production system to bring the crude oil to the surface.

The fuel gas generator may employ exhaust gases from an engine as a heat source to extract natural gas from the crude oil under production for use as fuel to operate the engines used to power gas compressors and electrical generators used in the crude oil production.

The exhaust gas cleaning system may include a cooling tower and heat exchanger system to reduce the flue gas temperature for further processing, a multistage gas compressor to drive the gases through system components and into the underground formations, a multistage gas scrubbing system to remove undesirable contaminants from the gases to be injected underground, an ion exchange system to remove nitrogen oxides from the water used in the scrubbing system, and a water storage and distribution system to supply makeup water to the cooling tower and washing water to the gas scrubbing systems.

The gas separation system may employ a membrane system to separate the carbon dioxide gas from the nitrogen gas obtained from the engine exhaust gases to inject a high concentration of carbon dioxide gas into an underground formation to reduce the viscosity of heavy oils and increase their ability to flow followed by injection of the nitrogen gas to drive the oils to the production wells where they can be brought to the surface.

The injection well system used to deliver the inert gases and water to the underground formation may include a well lined with a casing, a casing head at the surface, pressure and flow sensors, a flow control valve, and a controller to monitor and sequence the injection operation in accordance with the present invention. A second embodiment of the injection system used to deliver the inert gases and water to the underground formation may include a well lined with a casing, a casing head at the surface, a separate injection pipe inserted into the well casing with a packer above the production formation and perforated at the level of highest permeability in the production formation to reduce the volume of gas and water retained in the casing, avoid losing the injection gases through holes in the casing, and avoid having to drive a large volume of water otherwise collected in the casing back through the formation.

The production well system may employ an airlift pump to bring the crude oil to the surface consisting of a well lined with a casing, a casing head at the surface, a liquid level sensor in the well at the production level, pipes inserted inside the casing for production, air supply for the airlift pump, and electrical wiring to the level sensor, shutoff valves for air inlet and vent and for crude oil, packers to seal between the casing and the piping, a source of air, and a controller to time and sequence the operation.

A second embodiment of the production well system may employ a hydraulically operated crude oil pump with bladders to pump the crude oil and hydraulic fluid power to operate the bladders in the well to bring the crude oil to the surface consisting of a well lined with a casing perforated at the underground production zone, a casing head at the surface, an electrically powered hydraulically operated crude oil pump with bladders as the crude oil pumping mechanism and hydraulic fluid pumped into the bladders as the operating mechanism down the well to drive the crude oil to the surface, electrical wiring to supply power to the pump motor, a production pipe between the pump and the surface to carry the crude oil to the surface, packers to seal between the casing and the piping and the wiring, a pressure sensor above ground, a shutoff valve, and a controller to time and sequence the operation. Another embodiment of the a hydraulically operated crude oil pump with bladders employed in this production well system may include bladders as the crude oil pumping mechanism with a double-acting hydraulic cylinder system to supply the hydraulic fluid to the bladders and draw the hydraulic fluid out of the bladders to ensure their collapse in well applications with elevated temperatures. A third embodiment of the crude oil pump in this system may employ diaphragms as the crude oil pumping mechanism and hydraulic fluid pumped on top of the diaphragms with springs to return the extended diaphragms to the un-pressurized position as the operating mechanism.

BRIEF DESCRIPTION OF THE DRAWINGS

FIG. 1 is a schematic illustration of a flow diagram of an exhaust gas processing system including a fuel gas generator, an exhaust gas scrubbing or washing system, and a system for separation of nitrogen and carbon dioxide gases. FIG. 2 is a schematic illustration of systems for inert gas and water injection into and crude oil production from an underground formation nearly depleted of natural gas as a driving mechanism.

FIG. 4 illustrates the horizontal flow of the fluid as it enters the mixer. FIG. 5 is a fluid diagram illustrating the vertical flow of the fluids through the components of the fluid mixer.

FIG. 7 is a schematic representation of an exhaust gas membrane separation system to alternately inject carbon dioxide gas into the heavy oil formations to reduce the viscosity of the oils and then inject the nitrogen gas into the formation to drive the oil to production wells where it can be brought to the surface in accordance with the present invention.

FIG. 8 is a schematic representation of a vertical cross-sectional view of a typical oil well into which inert gases or water are injected into a well casing in accordance with the present invention.

FIG. 9 is a schematic representation of a vertical cross-sectional view of a typical oil well into which inert gases or water are injected into an injection pipe inserted in the casing in accordance with the present invention.

FIG. 11 illustrates a top view of the packer. FIG. 12 illustrates an elevation view of the packer. FIG. 13 illustrates a cross-sectional view of the packer taken from FIG. 11.

FIG. 16 is a vertical cross-sectional view of how the air from the air supply pipe or tube is attached to the oil production pipe so air can be injected into the production pipe to lift the oil to the surface.

FIG. 17 is a schematic illustration identifying the function of the piping in a typical oil well in which the cyclic injection and production (huff and puff) method is used in accordance with the present invention.

FIG. 20 is a top view of a hydraulically operated crude oil production pump illustrated in FIG. 19 identifying the crude oil pump and electrical motor in accordance with the present invention.

FIG. 21 is a cross-sectional view of a hydraulically operated crude oil pump in FIG. 19 without the electrical motor identifying major pump components in accordance with the present invention.

FIGS. 22–24 are enlarged cross-sectional views of the hydraulically operated crude oil production pump of FIG. 21 identifying system components in accordance with the present invention. FIG. 22 illustrates the top section of the pump with the upper crude oil pumping bladder and the crude oil outlet. FIG. 23 illustrates the middle section of the pump with the lower crude oil pumping bladder. FIG. 24 illustrates the crude oil inlet from the formation, the hydraulic operating fluid supply pump and directional control valve, and the electrical motor adapter.

FIG. 26 illustrates crude oil being expelled from the housing into the surface piping by the lower crude oil pumping bladder when hydraulic fluid is pumped inside the bladder and crude oil being drawn from the formation into the housing by the collapsing upper crude oil pumping bladder when hydraulic fluid pressure is removed. FIG. 27 illustrates crude oil being expelled from the housing into the surface piping by the upper crude oil pumping bladder when hydraulic fluid is pumped inside the bladder and crude oil being drawn from the formation into the housing by the collapsing lower crude oil pumping bladder when hydraulic fluid pressure is removed.

FIG. 29 illustrates the top section of the pump with the upper crude oil pumping bladder and the crude oil outlet. FIG. 30 illustrates the hydraulic cylinder section of the pump with three compartments. FIG. 31 is the third section of the pump with the lower crude oil pumping bladder. FIG. 32 illustrates the crude oil inlet from the formation, the hydraulic operating fluid supply pump and directional control valve, and the electrical motor adapter that are identical with those included in the discussions of FIGS. 22–24.

FIG. 33 illustrates crude oil being expelled from the housing into the surface piping by the upper crude oil pumping bladder when hydraulic fluid is pumped inside the bladder by the double acting hydraulic cylinder and crude oil being drawn from the formation into the housing by the collapsing lower crude oil pumping bladder when hydraulic fluid is drawn from inside the bladder by the double acting hydraulic cylinder. FIG. 34 illustrates crude oil being expelled from the housing into the surface piping by the lower crude oil pumping bladder when hydraulic fluid is pumped inside the bladder by the double acting hydraulic cylinder and crude oil being drawn from the formation into the housing by the collapsing upper crude oil pumping bladder when hydraulic fluid is drawn from inside the bladder by the double acting hydraulic cylinder.

FIG. 36 illustrates the top section of the pump with the upper diaphragm and the crude oil outlet. FIG. 37 illustrates the second section of the pump with the lower diaphragm. FIG. 38 illustrates the crude oil inlet from the formation, the hydraulic operating fluid supply pump and directional control valve, and the electrical motor adapter that are identical with those included in the discussions of FIGS. 22–24.

FIGS. 41 and 42 are schematic illustrations of the pumping operation of the third embodiment of the crude oil pump in accordance with the present invention. FIG. 41 illustrates crude oil being expelled from the housing into the surface piping by the lower oil pumping diaphragm when hydraulic fluid pressure is applied to the top of the diaphragm and crude oil being drawn from the formation into the housing by the upper crude oil pumping diaphragm when hydraulic fluid pressure is removed from the top of the diaphragm. FIG. 42 illustrates crude oil being expelled from the housing into the surface piping by the upper oil pumping diaphragm when hydraulic fluid pressure is applied to the top of the diaphragm and crude oil being drawn from the formation into the housing by the lower crude oil pumping diaphragm when hydraulic fluid pressure is removed from the top of the diaphragm.

FIG. 43 is a schematic representation of a fuel gas generator identifying major system components. FIG. 44 illustrates the vertical cross-sectional view and shows the flow of fluids as they flow through the gas generator. FIG. 45 provides a horizontal cross-sectional view of the fuel gas generator identifying system components.

DESCRIPTION OF ILLUSTRATIVE EMBODIMENTS

Illustrative embodiments of the invention are described below as they might be employed in the production of oil from fields nearly depleted of natural gas as a driving mechanism. In the interest of clarity, not all features of an implementation are described in this specification. It will of course by appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

The inert gas oil production system uses exhaust gases from an internal combustion engine or flue gases from a nearby industry as a driving mechanism for increasing and extending oil production in underground formations nearly depleted of natural gas as the driving mechanism and produced water as the blocking mechanism in accordance with the present invention. The inert gas oil production system FIGS. 1–2 consists of an exhaust gas processing system FIGS. 3–7 to purify the exhaust or flue gases before injection, a well inert gas and water injection system FIGS. 8–13 for delivering the inert gases and water to the underground oil production formation, an oil production well system FIGS. 14–42 for use when the large mechanical pump jacks have been removed, and a fuel gas generator FIGS. 43–45 for extracting natural gas from the crude oil under production as fuel for the engines that power the compressors and electrical generators.

Figure 1:
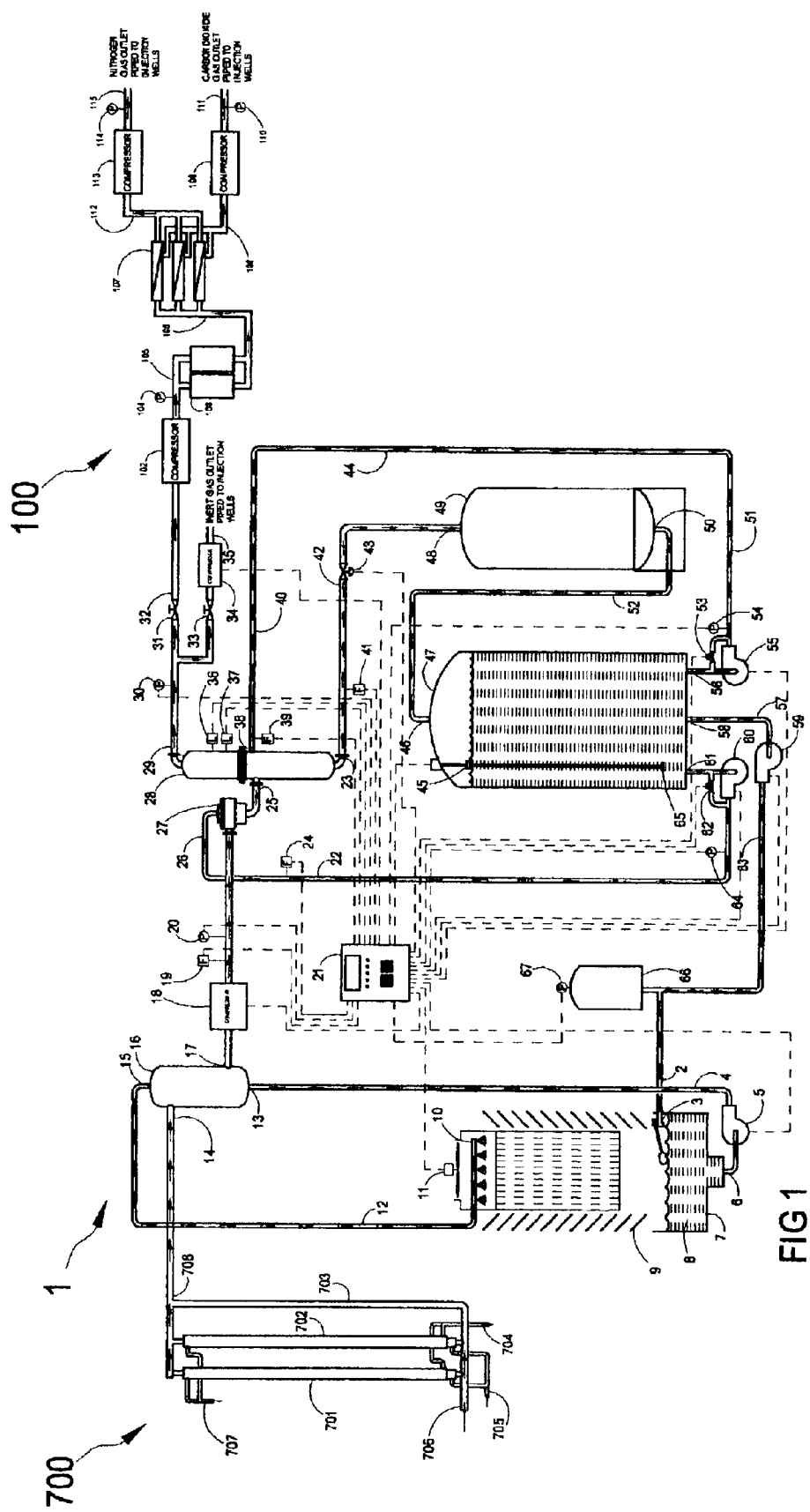
FIGS. 1 and 2 are schematic illustrations identifying major system components of an inert gas crude oil production system employing engine exhaust gases as a driving mechanism and produced water as a blocking mechanism for increasing and extending crude oil production from underground formations nearly depleted of a natural gas as a driving mechanism in accordance with the present invention.
Figure 2:
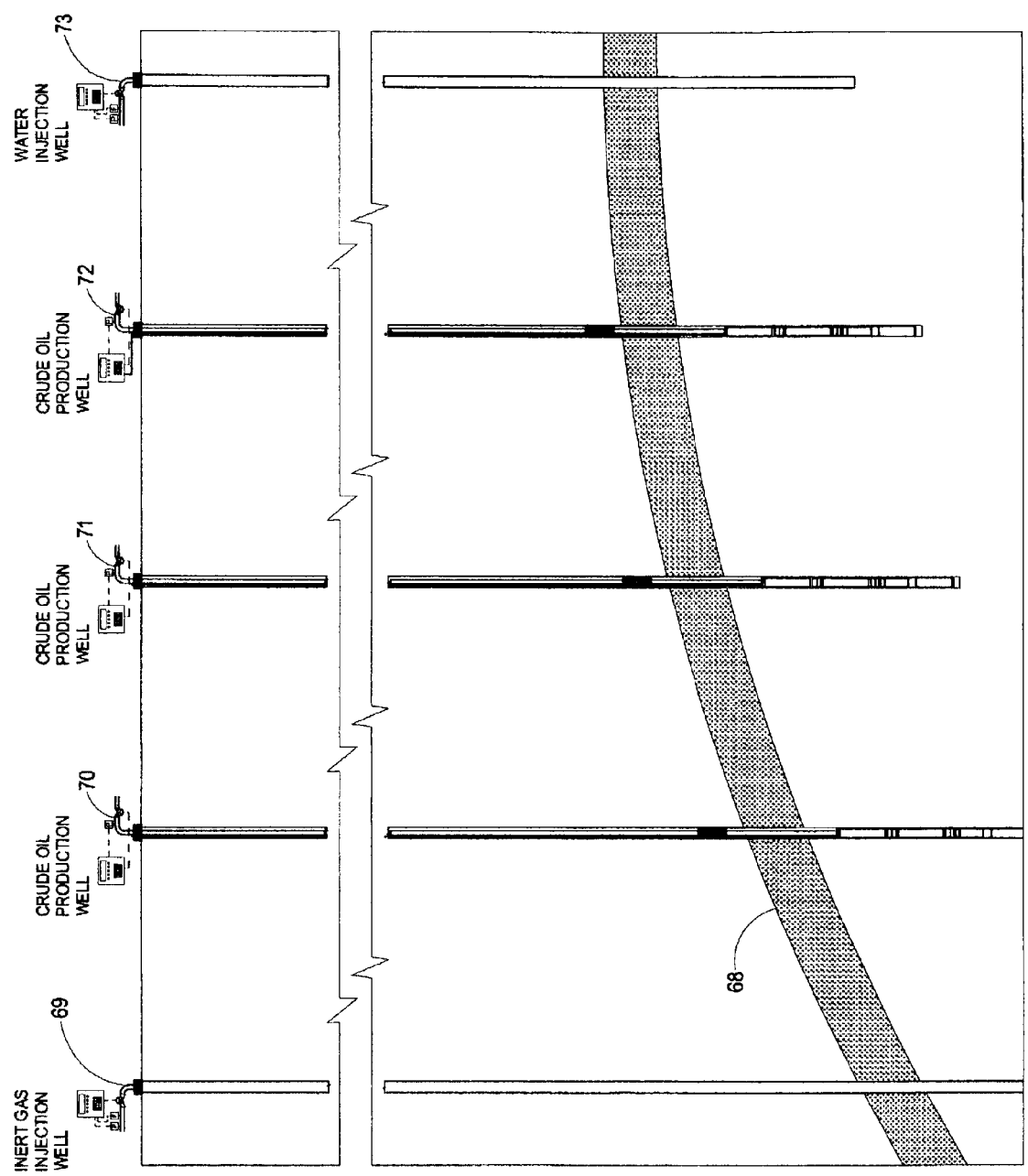

FIGS. 1 and 2 depict in schematic illustrations an exemplary inert gas crude oil production system for increasing and extending oil production from underground formations nearly depleted of natural gas as a driving mechanism in accordance with the present invention. The inert gas crude oil production system consists of a fuel gas generator 700 to extract natural gas from the crude oil under production to operate the engines used to power gas compressors and electrical generators used in the production process, an exhaust gas scrubbing or cleaning system 1 to remove corrosive contaminants from the exhaust gases to protect the systems above and below ground from corrosion, a gas separation system 100 to separate the cleaned carbon dioxide and nitrogen gases for separate injection into underground production formations 68, a well injection system 69 and 73 for injecting the inert gases and produced water respectively into the underground production formations 68, and a crude oil well production system 70–72 to bring the crude oil to the surface. Referring to FIG. 2, the wells into which the gases and water are to be injected are selected based on information about the underground formations in the existing fields from which the oil is to be produced. For injection of inert gases the wells 69 are selected at the lower part (down dip) of the sloping underground formation 68 as injection wells to receive the pressurized gases to drive the crude oil to production wells through which the oil is to be brought to the surface. The water injection wells 73 are selected for their position in the upper part (up dip) of the sloping underground formation to receive the water for directing the flow of the crude oil driven by the inert gases to the production wells 70–72 and prevent the inert gases from overrunning the crude oil and escaping from the formation under production. The systems identified are further described in following discussions of the drawings.

Figure 3:
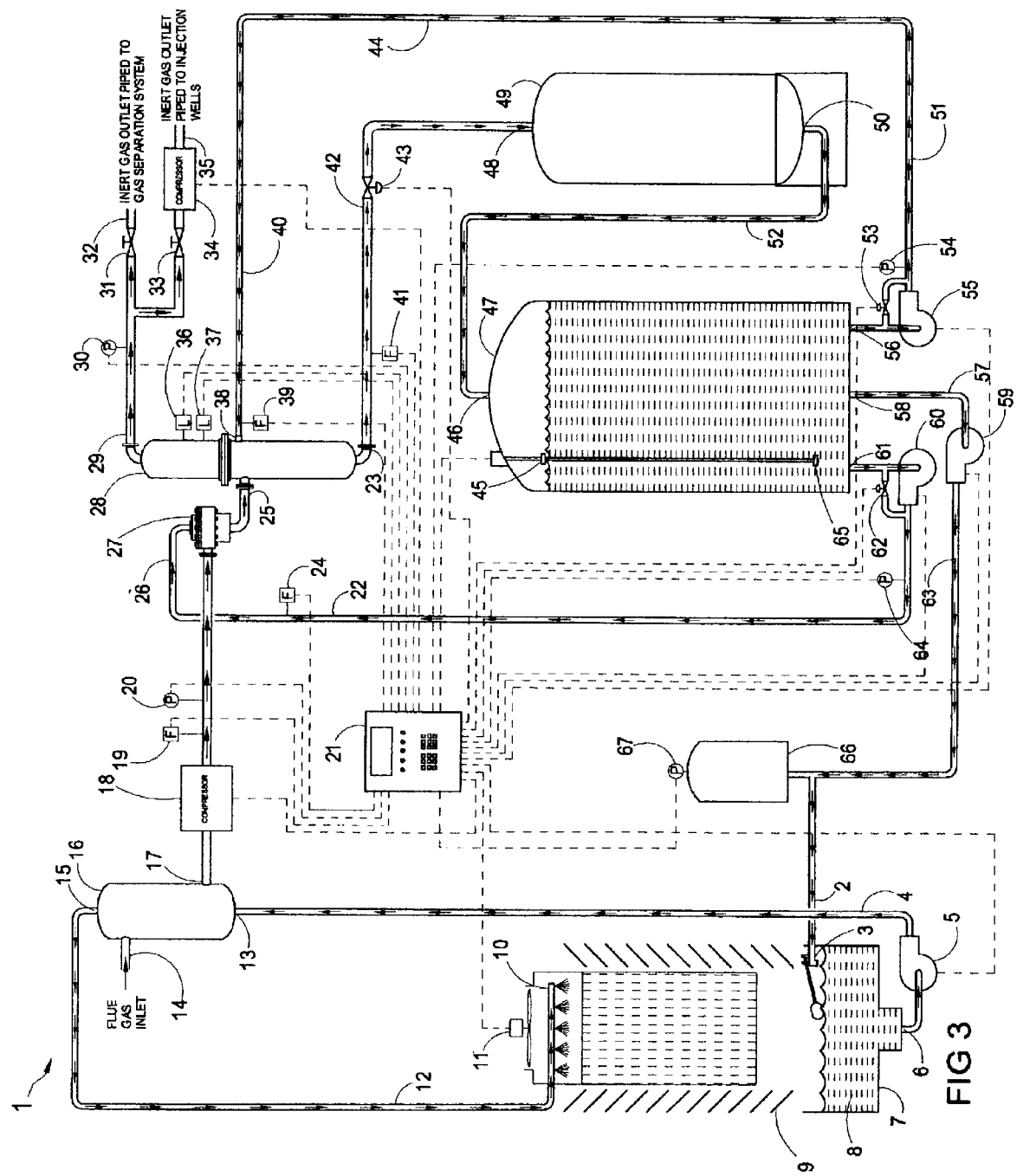
FIG. 3 is a schematic representation of an inert gas production system identifying major system components in accordance with the present invention.

FIG. 3 depicts in schematic illustration a flow diagram of an exemplary exhaust gas processing system 1 for preparing the flue gases injected for increasing and extending oil production from underground formations nearly depleted of natural gas as a driving mechanism in accordance with the present invention. The inert gas processing system 1 consists of exhaust or flue gases from combustion of methane or propane, an exhaust gas cooling system, a gas compressor with multistage compression capability, a two stage exhaust gas washing system to remove the nitrogen oxides and exhaust water vapors to purify the inert gases with an ion exchange system to remove the nitrogen oxides and permit reuse of the water, a gas separation system to separate the carbon dioxide and nitrogen gases for separate injection, and a controller to monitor and sequence system operations.

The exhaust or flue gases from which the inert gases are derived can be obtained as combustion products of methane or propane as fuel in an engine used on the production site to power the gas compressors in the system, or from combustion in a gas burner (not shown). As an alternate, flue gases can be obtained from a nearby industry as a raw material to produce the inert gases for injection.

The exhaust or flue gas cooling system consists of a heat exchanger 16, a cooling tower 9, a circulating pump 5, a cooling tower makeup water supply system to replace water evaporated in the cooling tower 9, and associated piping. The cooling tower makeup water supply system consists of a pump 59, a pressure tank 66 with a pressure switch 67, a float valve 3 in the basin 7 of the cooling tower 9, and associated piping. The arrows indicate the direction of fluid flow. Flue gases enter the system through inlet 14 and flow through the heat exchanger 16. Water is drawn by pump 5 from the basin 7 of cooling tower 9 through outlet port 6 and pumped through piping 4 into the heat exchanger 16 through the lower inlet port 13 where the flue gases are cooled. The water exits the heat exchanger 16 through outlet port 15 and flows through piping 12 to the cooling tower manifold 10 where it is sprayed and cooled by evaporation. The use of a cooling tower provides a method of disposing the excess water from the combustion process by evaporation in an environmentally friendly way.

The first stage of compression increases the gas pressure sufficient to drive the gases through the two stages of washing, and the additional one or more stages of compression follows the gas washing and increases the gas pressure to that required for injection into the underground formation. Generally, the pressure required for down-hole injection is approximately one pound-per-square-inch above atmospheric pressure, gage pressure (psig), per foot of depth to the underground formation. The compressor may have several additional stages of compression to reach the pressure levels require to operate the system.

The two-stage gas washing system consists of a first washing stage fluid mixer 27, a second washing stage fluid mixer 28 with a liquid-water separation chamber, an ion exchange resin tank 49 to remove the nitrogen oxides from the washing water, a water storage tank 47 with high and low level sensors 45 and 65 respectively to supply produced water to the cooling tower 9 and the two washing stages fluid mixers 27 and 28, two pumps 55 and 60, associated piping, liquid level sensors 36 and 37 in the fluid mixer 28, pressure sensors 20, 30, 54, and 64, and flow sensors 19, 24, and 39. Flue gases drawn from the heat exchange 16 outlet port 17 by the first stage compressor 18 flow into the first washing stage fluid mixer 27. Water is drawn from the storage tank 47 through outlet port 61 by pump 60 and discharges it into piping 22. A bypass valve 62 controls the flowrate of pump 60. The water from piping 22 flows into the first washing stage fluid mixer 27 through piping 26 where it is mixed with the incoming gases from the first stage compressor 18. The liquid-gas mixture flows out of the first washing stage fluid mixer 27 and into the second stage fluid mixer 28 through piping 25. A second stream of water is drawn from the storage tank 47 through outlet port 56 by pump 55 and is discharged into piping 51 under pressure. A bypass valve 53 controls the flowrate of pump 55. The water flows from piping 51 through piping 44 into the second washing stage fluid mixer 28 through inlet port 38 where it is mixed with the liquid-gas mixture from the first washing stage fluid mixer 27. The two stages of washing in the fluid mixers remove the nitrogen oxides and water vapors created as products of combustion leaving the gases of carbon dioxide ($CO_2$) and nitrogen ($N_2$) to be pressurized or further processed for injection into the underground formations.

In operation the flue gases, such as from the exhaust of an internal combustion engine (not shown) or from a fuel gas generator 700 (FIG. 1), enter the system through inlet 14 and flow into the heat exchanger 16 where they are cooled. The cooled flue gases are compressed in the first stage of a compressor 18 and flow into the first washing stage fluid mixer 27 with the flowrate and pressure monitored by sensors 19 and 20 respectively and indicated on the controller 21. The flue gases are mixed in the first washing stage fluid mixer 27 with water from the washing system entering through piping 26. The controller regulates the amount of water entering the first washing stage fluid mixer 27 by opening or closing the bypass valve 62 around pump 60 based on the information recorded from the flowrate and pressure sensors 19 and 20 of the gases, and on information recorded from flowrate sensor 24 of the water being fed into the first washing stage fluid mixer 27. The water-gas mixture flows out of the first washing stage fluid mixer 27 and into the second washing stage fluid mixer 28 through piping 25. The water-gas mixture is further mixed with water entering the second washing stage fluid mixer 28 through inlet port 38. The controller 21 regulates the amount of water entering the second washing stage fluid mixer 28 by opening or closing the bypass valve 53 around pump 55 based on the information recorded from flowrate and pressure sensors 39 and 54 respectively. The gases are separated from the water and flow out of the top of the second washing stage fluid mixer 28 through piping 29 where the pressure is monitored by pressure sensor 30. The gases from piping 29 flow into the compressor stages 34 through flow control valve 33 where the gas pressure is increased to a level needed for injection into the underground oil production formation or through flow control valve 31 and outlet 32 to the gas separation system described in a following discussion. The high-pressure inert gases exit the compressor 34 and flow to the injection wells through piping 35. The nitrogen oxides and the water vapors from the products of combustion remain with the water and flow out the bottom of the second washing stage fluid mixer 28 through the outlet 23. The controller maintains the water level in the second washing stage fluid mixer 28 between level sensors 36 and 37 by regulating the amount of water recorded by flow sensor 41 leaving the second washing stage fluid mixer 28 by opening and closing outlet control valve 43.

Figure 4:
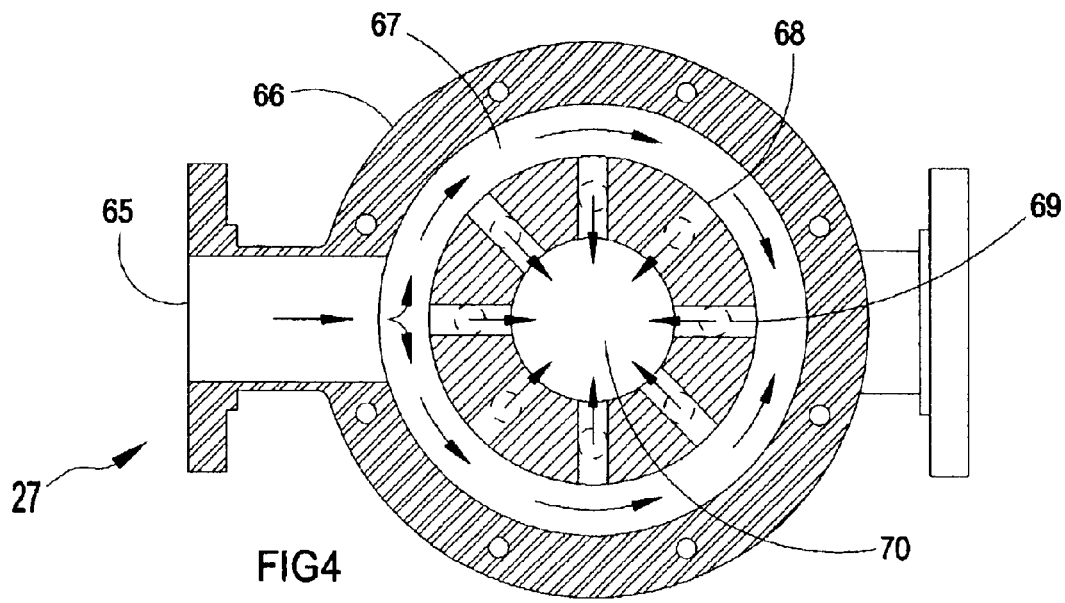
FIGS. 4 and 5 are fluid diagrams of a first washing stage fluid mixer employing a radial-grooved ring to divide the entering gaseous fluids, mix the gaseous fluids with the water entering through orifices over each groove, and inject the mixture of fluids in high velocity multiple streams into an impact zone inside the housing in accordance with the present invention.
Figure 5:
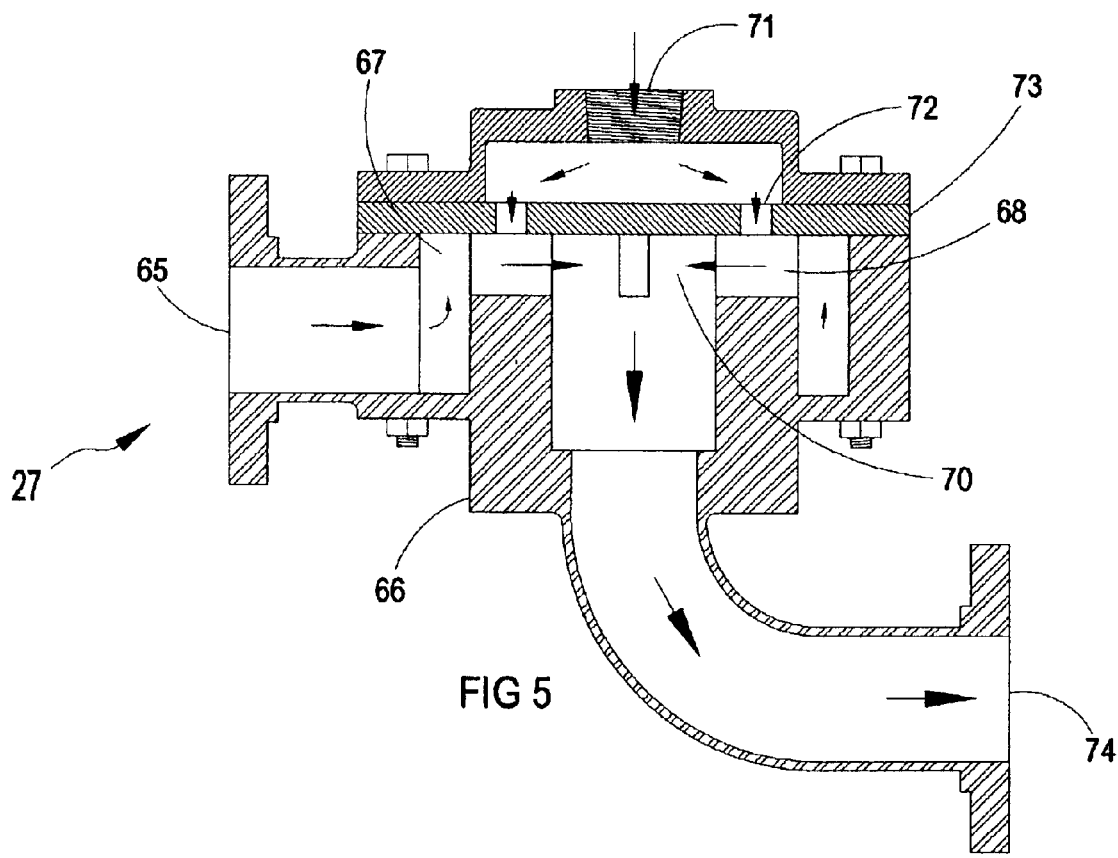
Figure 6:
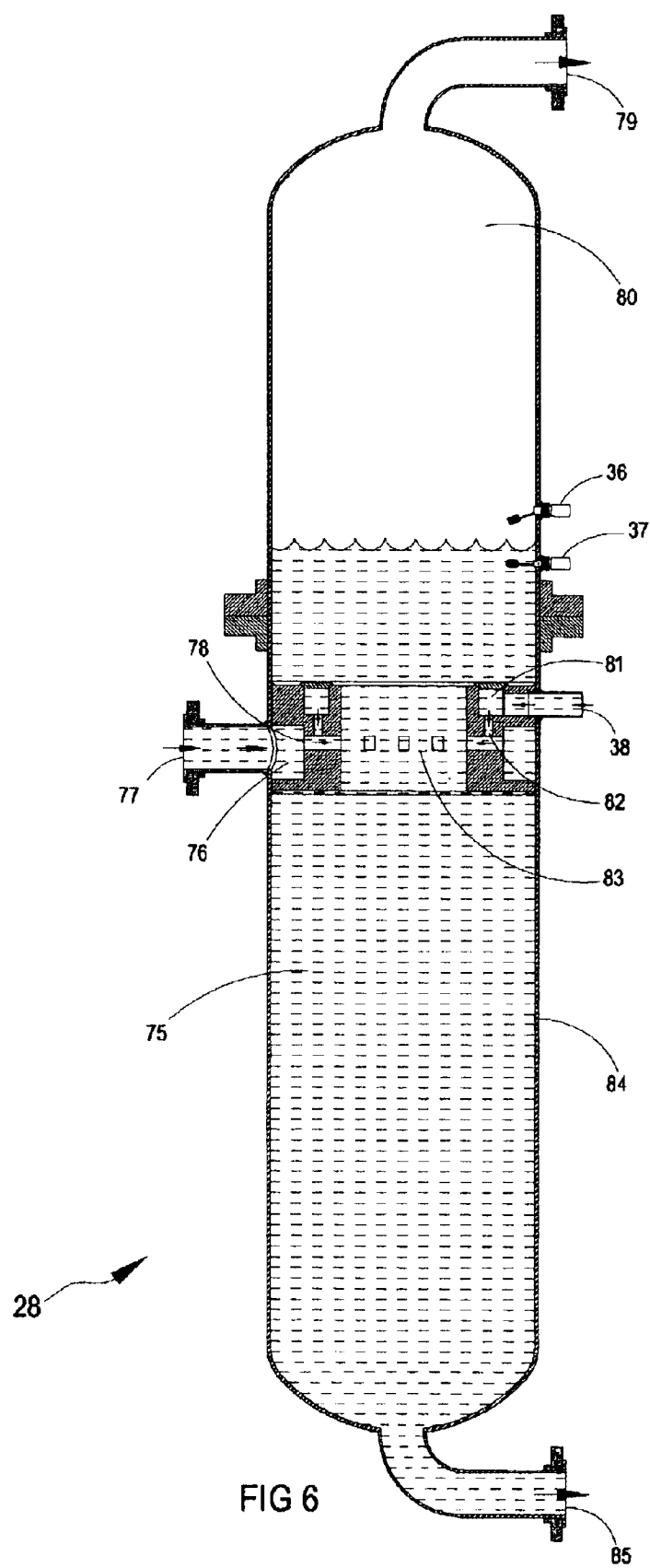
FIG. 6 is a fluid diagram illustrating the vertical flow of fluids in a second washing stage fluid mixer employing a radial-grooved ring to divide the entering gas-liquid mixture from the first washing stage fluid mixer, mix those fluids with a second stream of water entering through orifices over each groove, and inject the fluids in high velocity multiple streams into an impact zone inside the housing where the washed gases are separated from the liquid in accordance with the present invention.

The fluid mixers 27 and 28 used as gas scrubbers or washers may correspond structurally and functionally to the radial-grooved ring mixer disclosed in co-pending patent application Ser. No. 09/879,496, filed Jun. 12, 2001, now issued as U.S. Pat. No. 6,669,843, entitled "Method and Apparatus for Mixing Fluids, Separating Fluids, and Separating Solids from Fluids," in the name of Johnny Arnaud and assigned to the same assignee as the present application. The fluid mixers applied as gas washers are shown in FIGS. 4–6. While the radial-grooved ring mixers are described herein, the foregoing co-pending application is hereby incorporated herein by reference and can be referred to for further structural detail.

FIGS. 4 and 5 illustrate the fluid mixer 27 applied as a gas washer or scrubber in the first stage of the flue gas washing system. FIG. 4 depicts a horizontal cross-sectional view of the fluid inlet to the fluid mixer 27 illustrating the radial-groove ring 66, the distribution channel 67, the eight radial grooves 68, the position of orifices 69 over the radial grooves 68, and an impact zone 70 to which the radial grooves 68 are directed. FIG. 5 provides a vertical cross-sectional view of the first washing stage fluid mixer 27 assembly consisting of top inlet housing 71, an orifice plate 73 with orifices 72, and a radial-grooved ring 66 with and impact zone 70 combined with a lower outlet 74. The arrows indicate the direction of fluid flow. The flue gases from the first stage gas compressor 18 in FIG. 1 enter the fluid mixer 27 from the side inlet 65, flow around the distribution channel 67, and are injected at high velocity through the radial grooves 68 and mixed with the water entering from the orifices 72 and flow into the impact zone 70. The water enters the top housing 71 and flows through the orifices 72 into the radial grooves 68 to be mixed with the gases. The gases become washed in the impact zone 70, and the water and gases flow out of the first washed stage fluid mixer 27 through the outlet 74.

FIG. 6 depicts a fluid schematic diagram of a vertical cross-sectional view of the fluid mixer 28 applied as the second stage exhaust gas washer illustrating the function of the fluid mixer 28. The fluid mixer 28 consists of the gas-water mixture inlet 77, a gas-water distribution channel 76, radial grooves 78, a water inlet port 38, a water distribution channel 81, water injection orifice ports 82, an impact zone 83, a lower cylinder 84 with a water outlet 85, a gas separation chamber 80 with a gas outlet 79. In operation, the gas-water mixture from the first washing stage fluid mixer 27 enters the second washing stage fluid mixer 28 through the gas-water mixture inlet 77 and flows into the distribution channel 76, is divided into multi-streams and flows through the grooves 78 where additional water is injected into each groove through the orifice ports 82 over the grooves and exits the grooves 78 at high velocity into the impact zone 83. The additional water enters through inlet port 38 and flows into the distribution channel 81 and is injected through the orifice ports 82 into each groove 78 and into the impact zone 83 where the combustion water vapors and the nitrogen oxides are removed from the flue gases. The water flows downward and exits the fluid mixer 28 through the outlet 85. The carbon dioxide and nitrogen gases are separated from the water in the gas separation chamber 80 and exit the fluid mixer 28 through the upper outlet 79. The water level in the fluid mixer is maintained between the upper and lower level sensors 36 and 37 respectively by the system controller 21 when operating in the system.

FIG. 7 depicts in schematic illustration a flow diagram of a membrane gas separation system 100 to separate the carbon dioxide and nitrogen gases for injection into separate parts of heavy oil producing formations in accordance with the present invention. The high concentration of carbon dioxide gas will be absorbed into the heavy oils to reduce the viscosity and increase their ability to flow from the injection wells to the production wells. When it is determined from analysis that the flow of oil has reached an optimum level in a specific part of the production formation, the carbon dioxide injection may be discontinued and the nitrogen gas may then be used as a driving mechanism to force the oils to the production wells. The alternating injection of carbon dioxide gas to reduce viscosity then nitrogen gas to drive the oil to the production wells may be used throughout the formation as long as the heavy oils can be produced economically. Again from an overall point of view, the slow injection of carbon dioxide gas in selected wells may be used to reduce the heavy oil viscosity in certain parts of an oilfield and a high injection flow of nitrogen may be injected in other parts where the viscosity has already been reduced to drive the oils to the production wells. When determined to be beneficial, a mixture of carbon dioxide and nitrogen gases may be used to continue reducing the oil viscosity as it is driven to the production wells. Referring to FIG. 7, the membrane gas separation system 100 consists of a compressor 102, a gas dryer 103 to remove moisture from the gases, one or more gas separation membranes 107, a gas compressor 113 to increase the nitrogen gas pressure to the level required for injection into certain wells in the oil production formation, and a gas compressor 109 to increase the carbon dioxide gas pressure to the level required for injection into other wells of the oil production formation. In operation, the inert gases (carbon dioxide and nitrogen) flowing out of the second washing stage fluid mixer 28 through piping 29 enter compressor 102 where the gas pressure is increased to the operating level required by the gas dryer 103 and the gas separation membranes 107. The gases from the inert gas washing system enter the gas separation system 100 through inlet piping 101 and flow out of compressor 102 into piping 105 where the pressure is monitored by pressure sensor 104. The gases from piping 105 enter the gas dryer 103 where the moisture is removed. The dried gases flow out of the gas dryer 103 and enter the membranes 107 through piping 106. The carbon dioxide and nitrogen gases are separated in the membranes 107 by allowing the carbon dioxide gas to flow through the membranes as permeate and by rejecting the larger nitrogen molecules. The nitrogen gas flows out of the membranes 107 through piping 112 and into gas compressor 113 with one or more stages where the nitrogen gas pressure is increased and exits through piping 115 at the pressure level required for injection into the underground oil production formation. The inlet side of compressor 109 is connected to piping 108 and applies a suction to the permeate side of the membranes 107 to assist in drawing the carbon dioxide gas through the membranes. The carbon dioxide gas pressure is increased by compressor 109 with one or more stages and exits through piping 111 for distribution to injection wells at the pressure required for injection into the underground oil production formation to be absorbed by the heavy oils and reduce their viscosity.

FIG. 8 depicts a schematic illustration in a vertical cross-sectional view of a typical oil well used for injection of inert gases or water into an underground oil bearing formation to serve as a driving mechanism to enhance oil production in accordance with the present invention. The injection well 150 consists of a casing head 159 at ground level 153, inlet piping 154, pressure and flow sensors 155 and 156 respectively, a flow control valve 158, a controller 157, a well casing 160 through all strata 152 above the oil sand 151 from which the oil is produced, and an accumulation chamber or reservoir 162 below the oil sand 151. The casing is shown to extend below the oil sand 151 and is perforated 161 over the entire area where it is in contact with the oil sand 151. In wells with a thick oil producing formation the perforation may extend only over the part of the formation with the highest permeability. In wells where the formations will not collapse, the casing may be stopped, or ended, just above the oil sand 151. The arrows indicate the direction of flow. Inert gases from the outlet piping 35 of the high pressure compressor 34 in FIG. 1, from the outlet piping 115 of high pressure compressor 113 in FIG. 7, from the outlet piping 111 of high pressure compressor 109 in FIG. 7, or water from a pump (not shown) enter the injection well through inlet piping 154 and flow down the well casing 160 and through the perforated casing 161 into the oil bearing sand 151 to drive the oil to the production wells.

FIG. 9 depicts a schematic illustration in vertical sectional view of another embodiment of a typical oil well used for injection of inert gases or water into underground oil bearing formations to serve as a driving mechanism to enhance oil production employing a separate injection pipe inserted inside the well casing with packers sealing the annulus above the oil bearing formation in accordance with the present invention. The use of a separate injection pipe sealed by packers above the oil bearing formation minimizes the volume of injection gases required to fill the space, avoids losing the injection gases through holes in a corroded casing, and, by perforating the injection pipe only at the level where the oil sand has the highest permeability, avoids having to force the water that collects up the casing back down the casing and into the oil formation. Referring to FIG. 9, the injection well 163 consists of a casing head 159 at ground level 153, an inlet piping 154, pressure and flow sensors 155 and 156 respectively, a flow control valve 158, a controller 157, a well casing 160 through all strata 152 above the oil sand 151 from which the oil is produced, an accumulation chamber or reservoir 162 below the oil sand 151, an injection pipe 163, and packers 164 and 165. Inert gases from the outlet piping 35 of the high pressure compressor 34 in FIG. 3, from the outlet piping 115 of high pressure compressor 113 in FIG. 7, from the outlet piping 111 of high pressure compressor 109 in FIG. 7, or water from a pump (not shown) enter the injection well through inlet piping 154 and flow down the production pipe 163, through the perforation in the bottom of the production pipe 163, and into the oil sand 151 through the perforated casing 161 to drive the oil to the production wells.

Figure 10:
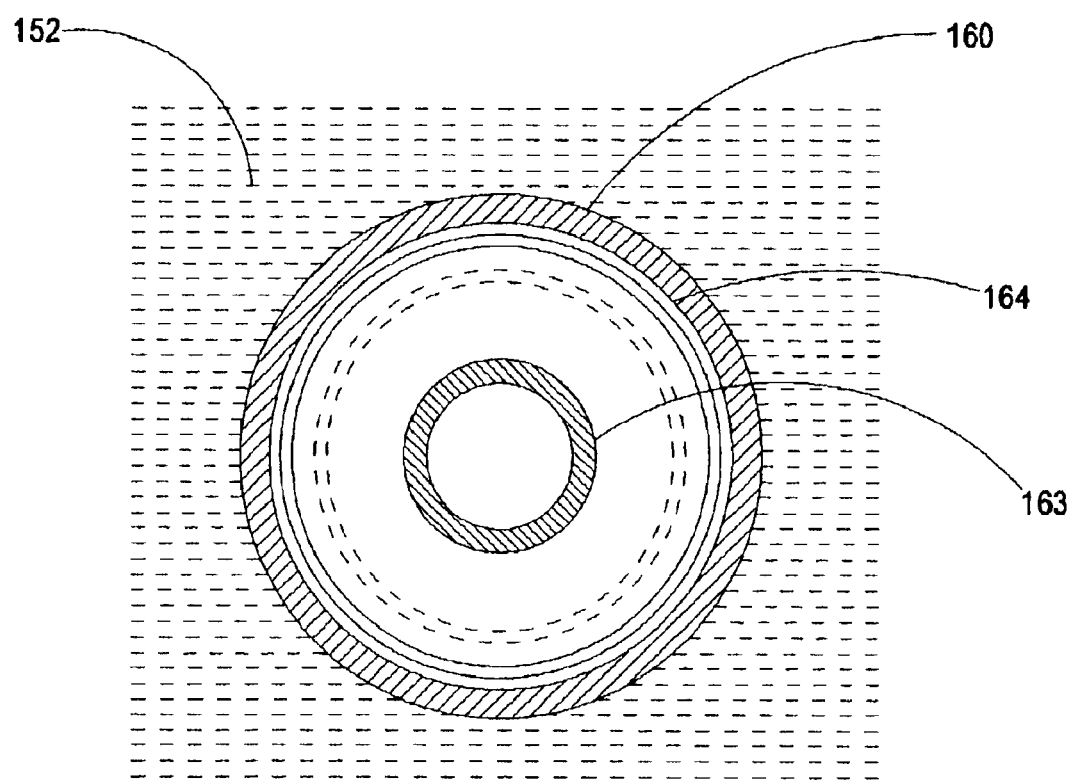
FIG. 10 is a schematic representation of a horizontal cross-sectional view showing installation of the packers in a typical oil well used for injection of inert gases or water in accordance with the present invention.

FIG. 10 is a horizontal cross-sectional view G—G of the injection well taken from FIG. 9. The well casing 160 prevents the ground formation 152 from collapsing into the well bore. The packer 164 seals the annulus, or space, between the well casing 160 and the injection pipe 163.

Figure 11:
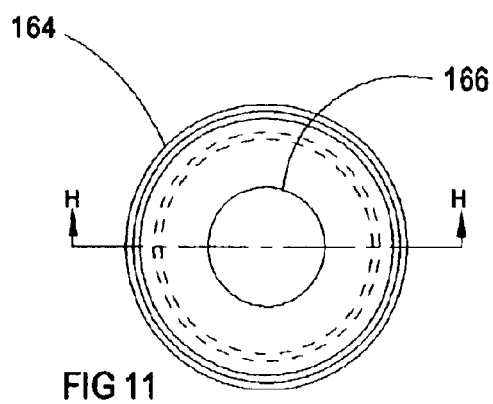
FIGS. 11–13 are illustrations of a down-hole packer used to seal between the outside of the piping inserted and the inside wall of the well casing in accordance with the present invention.
Figure 12:
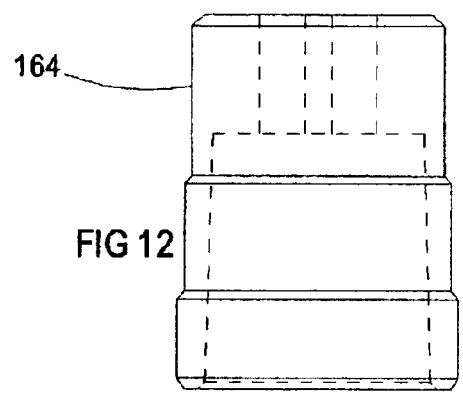
Figure 13:
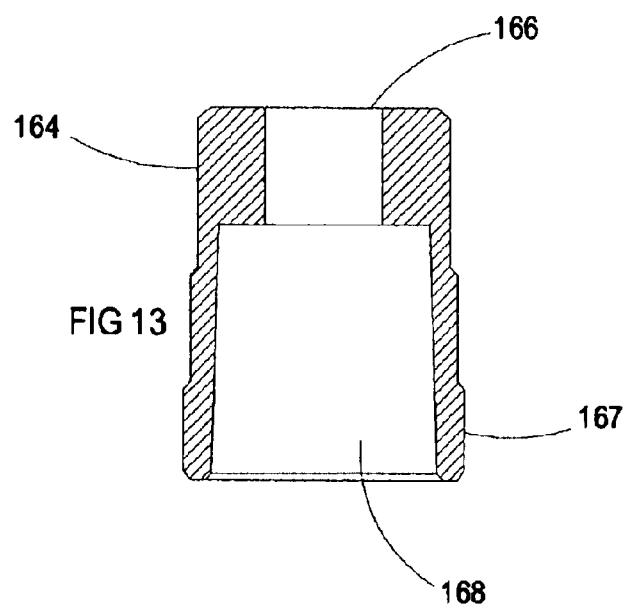

FIGS. 11–13 depict an illustration of the packer 164 or 165 used to seal the annulus down the well hole for production of oil by injection of inert gases into the underground oil sand formation in accordance with the present invention. FIG. 11 provides a top view of packer 164 or 165 with a hole 166 for the injection pipe. FIG. 12 provides a side elevation illustration of the packer 164 or 165. FIG. 13 provides a vertical cross-sectional view H—H of the packer 164 taken from FIG. 11. The material used to manufacture the packer is an elastomer or rubber like synthetic material with polyurethane the current material of choice. The packer is manufactured in a cup configuration with the outside diameter of the cup end 167 slightly larger than the inside diameter of the well casing. The packer 164 is attached to the tubing or piping used in the injection and production wells and driven down the well casing with the tubing when inserted down hole. The open cup end of the bottom packer 168 is positioned downward in the well facing the direction of the highest pressure, such as when the gases are injected into the well for production. The higher pressure applied inside the packer cup increases the pressure applied by the largest diameter 167 of the packer to the inside diameter of the well casing 160. The upper packer 164 is also positioned with the open cup end downward in normal circumstances; however, when inserted in a well that leaks water into the casing the upper packer 164 may be reversed and installed with the cup facing upward to prevent the water from reaching the oil below the two packers.

Figures 14, 15:
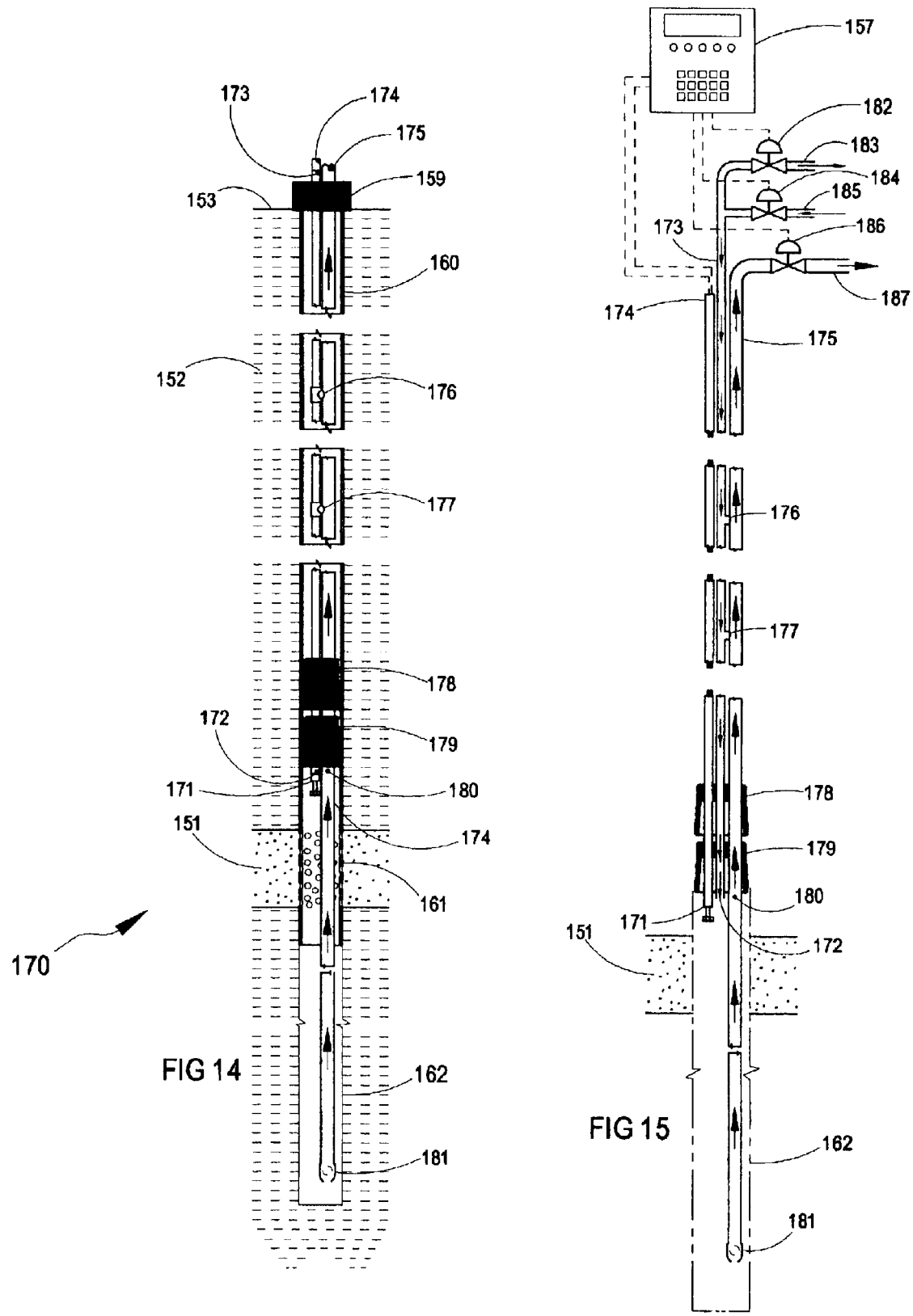
FIG. 14 is a schematic representation of a vertical cross-sectional view of a typical oil well in production with an airlift pump to extract the oil from the well in accordance with the present invention.
FIG. 15 is a schematic illustration identifying the functions of the piping in a typical production well with an airlift pump in accordance with the present invention.

FIG. 14 depicts a schematic illustration of a fluid diagram in a vertical cross-sectional view of a typical oil well 170 converted for production from an underground oil bearing formation or oil sand 151 employing an airlift crude oil pump where inert gases are injected into an adjacent well as a driving mechanism to enhance oil production in accordance with the present invention. The production well 170 consists of a casing head 159 at the ground level 153, a well casing 160 through all strata 152 above the oil sand 151 from which the oil is drawn, and an accumulation chamber or reservoir 162 below the oil sand 151. Again, the casing 160 is shown to extend below the oil sand 151 and perforated 161 over the entire area where the casing 160 contacts the oil sand 151, and in wells where the formations will not collapse, the casing may be stopped, or ended, just above the oil sand 151. An airlift crude oil pump is inserted into the casing 160 of the production well to lift the oil to the surface and replace the large and high cost mechanical pumps (pump jacks) familiar in oilfields. The mechanical pumps already in place and operating may be left on production wells and incorporated into the inert gas injection method of oil production. The pumps do not have to be removed from wells used for inert gas injection when the annulus is used for injection but the wellheads must be sealed. The airlift pump consists of production tube 175, an air supply tube 173, a level sensor 171 with the signal wires encased in a third tube 174 inserted into the well casing 160, and two packers 178 and 179. The air supply tube 173 is fitted with tees 176 and 177 spaced approximately 300 feet apart along the length of the tube and welded over an orifice in the production tube 175 to supply the air to lift the oil inside the production tube 175 to the surface. The method of attaching the air supply and production tubes is described in a following discussion. There are two packers 178 and 179 used to seal the space between the three pipes and the well casing. The space between the three pipes and the well casing is generally referred to as the "annulus," derived from the term defining the space when a single pipe is inserted into a well casing. The end of the air supply tube is open 172 below the packers 178 and 179. An orifice 180 is also provided in the production tube 175 just below the lower packer 179 to assist in the airlift operation. The operation of the airlift pump is included in the following discussion where the controls are also illustrated in a flow diagram.

FIG. 15 depicts a fluid schematic illustration of the tubing in the airlift pump system of FIG. 14 used in a production well with the casing removed and the tubing laid side by side for clarification of the production operation. The airlift pump consists of a production tube 175 with a production control valve 186, an air supply tube 173 with an air inlet control valve 184 and an air vent valve 182, a level sensor 171 with the signal wires encased in a third tube 174, two packers 178 and 179, and a controller 157 to time and sequence the production operation. The controller selected may be capable of controlling all injection and production functions and may be used throughout the oilfield. A foot valve 181 with a ball check is located on the bottom of the production tube 175 extending down into the oil reservoir 162 to prevent oil from draining back to the reservoir 162 when production is stopped. During operation, oil flows into the reservoir 162 from the oil sand 151. When the oil fills the reservoir 162 it is detected by the level sensor 171 and provides a signal to the controller 157. The controller 157 closes the air vent valve 182 and opens the oil production control valve 186 and the air inlet control valve 184 to operate the airlift pump. Air from an air supply (not shown) enters through inlet 185 and flows through air inlet control valve 184 and the air supply tube 173 into the reservoir 162 above the accumulated oil. Air is also injected from the air tube 173 into the production tube 175 at various locations 176 and 177. The air pressure above the oil in the reservoir 162 forces the oil through the foot valve 181 and up the production tube 175 and through the production control valve 186 and exits the well through the outlet 187 and flows to a gathering or storage tank, or gun barrel, (not shown) where oil from all the wells is accumulated for oil-water separation and transportation. The airlift pump operates for a period of time that is preset in the controller 157 then shuts down the production by closing the air inlet valve 184, closing the production control valve 186, and opening the air vent valve 182.

FIG. 16 is a cross-sectional illustration of the joining of the air supply tube 173 with the production tube 175. A tee 188 is inserted into the air supply tube 173 where it is to be joined with the production tube 175. The tee 188 can be welded 189 or screwed onto the air supply tube 173. An orifice 191 is drilled into the production tube 175 where it is to be joined with the air supply tube 173. The size of the orifice is related to the size of the production tube 175 and the amount of oil to be lifted to the surface. As an example, a one-sixteenth-inch (1/16 inch) diameter orifice spaced approximately every 300 feet apart will typically supply enough air for operation of a 1-inch diameter production tube. The tee 188 on the air supply tube 173 is positioned over the orifice 191 in the production tube 175 and welded 190 in place.

FIG. 17 depicts a fluid schematic illustration of the tubing in a combination airlift pump system and inert gas injection system used in a cyclic injection-production well, or a huff and puff operation, with the casing removed and the tubing laid side by side for clarification of the injection and production operating cycles in accordance with the present invention. The combination injection and airlift pump systems consist of a production tube 175 with a production control valve 186, an air supply tube 173 with an air inlet control valve 184 and an air vent valve 182, a level sensor 171 with the signal wires encased in a third tube 174, two packers 191 and 192, an inert gas injection tube 193 with an injection control valve 194, pressure and flow sensors 196 and 197 respectively, and a controller 157 to time and sequence the combination injection-production operation. A foot valve 181 with a ball check is located on the bottom of the production tube 175 extending down into the oil reservoir 162 to prevent oil from draining back to the reservoir 162 when production is stopped. During operation, air vent valve 182 is closed and the injection control valve 194 is opened and inert gases from the outlet piping 35 of the high pressure compressor 34 in FIG. 3, from the outlet piping 115 of high pressure compressor 113 in FIG. 7, or from the outlet piping 111 of high pressure compressor 109 in FIG. 7 enter the injection well through inlet piping 154 and flow down the well casing 160 and through the perforated casing 161 into the oil sand 151 until the formation is pressurized around the injection well. As an example, the inert gases may be injected for 10 to 30 days to pressurize an oil producing formation depending on the rate of inert gas injection allowed and by the size of the specific formation. The time of injection and the flowrate of the inert gases are preset in the controller 157. At the end of the inert gas injection period the injection is automatically shut down by the controller 157 by closing the injection control valve 194 and opening the air vent valve 183. The oil is allowed to flow into the reservoir 162 from the oil sand 151. When the oil fills the reservoir 162 it is detected by the level sensor 171 and provides a signal to the controller 157. The controller 157 closes the air vent valve 182 and opens the oil production control valve 186 and the air inlet control valve 184 to operate the airlift pump. Air from an air supply (not shown) enters through inlet 185 and flows through air inlet control valve 184 and the air supply tube 173 into the reservoir 162 above the accumulated oil. Air is also injected from the air tube 173 into the production tube 175 at various locations 176 and 177. The air pressure above the oil in the reservoir 162 forces the oil through the foot valve 181 and up the production tube 175 and through the production control valve 186 and exits the well through the outlet 187 and flows to a gathering or storage tank, or gun barrel, (not shown) where oil from all the wells is accumulated for oil-water separation and transportation. The airlift pump operates for a period of time that is preset in the controller 157 then shuts down the production and restarts the injection process by closing the air inlet valve 184, closing the production control valve 186, and opening the air injection control valve 194. The cyclic injection and production operations are repeated for as long as oil can be economically produced from the oil-bearing formation or oil sand 151.

Figures 18, 19:
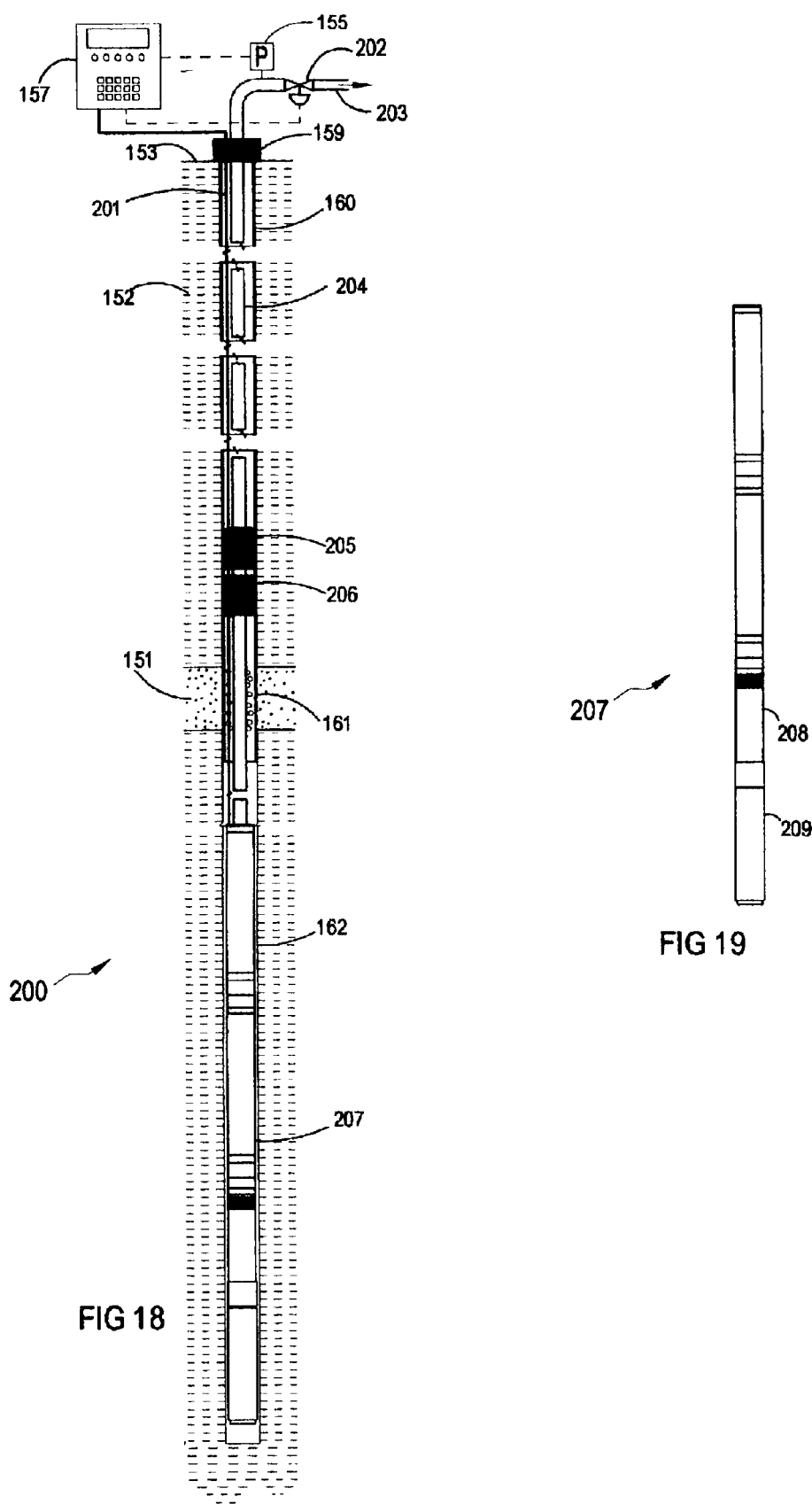
FIG. 18 is a vertical schematic of a typical oil well in production employing a hydraulically operated crude oil production pump to bring the crude oil to the surface in accordance with the present invention.
FIG. 19 is an elevation view of a hydraulically operated crude oil production pump illustrated in FIG. 15 in accordance with the present invention.

FIG. 18 depicts in schematic illustration a fluid diagram in a vertical cross-section of another embodiment of a typical oil well 200 converted to production from an underground oil bearing formation employing a hydraulically operated crude oil pump 207 with an electric motor where inert gases are injected into an adjacent well as a driving mechanism to enhance oil production in accordance with the present invention. The production well 200 consists of a casing head 159 at the ground level 153, a well casing 160 through all strata 152 above the oil sand 151 from which the crude oil is drawn, and an accumulation chamber or reservoir 162 below the oil sand 151. Again, the casing 160 is shown to extend below the oil sand 151 and perforated 161 over the entire area where the casing 160 is in contact with the oil sand 151. A crude oil production pump 207 is inserted into the casing 160 of the production well 200 to lift the crude oil to the surface and replace the large and high cost mechanical pump (pump jack) familiar in oilfields. Produced water (saltwater) and sand are typically pumped and carried to the surface with the crude oil.

FIG. 19 depicts an elevation view of a typical crude oil production pump 207 in accordance with the present invention. The crude oil production pump 207 consists of the hydraulically operated crude oil pump 208 and an electric motor 209. The electric motor 209 is an electric motor commercially available from a number of manufacturers and not described further in the discussions of the hydraulically operated crude oil pump 208.

FIG. 20 provides an illustration of the top view of the hydraulically operated crude oil pump 208 identifying the crude oil outlet 211 and an opening 210 in the pump housing for the electrical wiring that supplies electrical power to the motor below the hydraulically operated crude oil pump 208.

FIG. 21 depicts a vertical cross-sectional view A—A of the hydraulically operated crude oil pump 208 of the crude oil production pump 207 taken from FIG. 20. The hydraulically operated crude oil pump 208 consists of a pump cap 217 with the crude oil outlet 211, an upper crude oil pumping section 216, a lower crude oil pumping section 215, a crude oil inlet 214 where the crude oil enters the pump, a hydraulic pump and control valve assembly 213, and an electric motor adapter 212. The entire pump is limited in diameter by the inside diameter of the casing into which it is to be installed. The predominant size casing used in the United States has a 4-inch inside diameter, therefore, the pumps or other equipment to be used down the well must be able to be inserted inside the casing 160 and be driven through bends in the casing 160 and accumulated tar and corrosion that may be attached to the inside diameter.

FIGS. 22–24 provide enlarged cross-sectional views of the various components of the hydraulically operated crude oil pump 208 identified in FIG. 21. FIG 22 provides an enlarged a cross-sectional view of the pump cap 217 and the upper crude oil pumping section 216. FIG. 23 provides an enlarged cross-sectional view of the lower crude oil pumping section 215. FIG. 24 provides an enlarged cross-sectional view of the crude oil inlet 214, the hydraulic pump and control assembly 213, and the electric motor adapter 212. The various parts of the pump housing are brazed or soldered together and described further in a following discussion. Referring to FIG. 22, the pump cap 217 provides a threaded crude oil outlet 211 to connect the pump to the piping (not shown) that carries the crude oil to the surface during operation. The upper crude oil pumping section 216 consists of an upper pump housing 222 into which the crude oil is drawn from the formation then expelled to flow to the surface, an expandable bladder 223 of elastomer material to separate the crude oil outside the bladder 223 from the hydraulic fluid inside the bladder 223 used to operate the pump, a perforated bladder internal support 224, a bladder retainer 226, a pump housing top 221, a lower adapter 219 with a hydraulic fluid inlet 228 and a crude oil inlet-outlet passageway 227, an outlet checkvalve 229 with the outlet check ball 218, and an inlet checkvalve 230 with the inlet check ball 231. During operation, the bladder 223 is inflated by applying hydraulic pressure inside the bladder 223 through the hydraulic fluid inlet 228 and the perforated internal bladder support 224. The inflated bladder 223 expels the crude oil in the space 225 outside the bladder 223 through the crude oil inlet-outlet passageway 227, lifts the outlet check ball 218, and flows up the crude oil passageway 220 to the pump outlet 211. When hydraulic fluid pressure is removed from inside the bladder 223 it collapses and draws crude oil from the production formation through the inlet 232 lifting the inlet check ball 231 and flows through the crude oil inlet-outlet passageway 227 into the space 225 outside the bladder 223. A detailed description of the pump operation is provided in the discussions of FIGS. 24 and 25. Referring to FIG. 23, the lower crude oil pumping section 215 consists of a lower pump housing 237 into which the crude oil is drawn from the formation then expelled to flow to the surface, an expandable bladder 238 of elastomer material to separate the crude oil outside the bladder 238 from the hydraulic fluid inside the bladder 238 used to operate the pump, a perforated internal bladder support 239, a bladder retainer 241, a housing top 236, a lower adapter 234 with a hydraulic fluid inlet 243 and a crude oil inlet-outlet passageway 242, an outlet checkvalve 244 with the outlet check ball 233, and an inlet checkvalve 245 with the inlet check ball 246. During operation, the bladder 238 is inflated by applying hydraulic pressure inside the bladder 238 through the hydraulic fluid inlet 243 and the perforated internal bladder support 239. The inflated bladder 238 expels the crude oil in the space 240 outside the bladder 238 through the crude oil inlet-outlet passageway 242, lifts the outlet check ball 233, and flows up the crude oil passageway 220 to the pump outlet 211. When hydraulic fluid pressure is removed from inside the bladder 238 it collapses and draws crude oil from the production formation through the inlet 247 lifting the inlet check ball 246 and flows through the crude oil inlet-outlet passageway 242 into the space 240 outside the bladder 238. Referring to FIG. 24, the crude oil inlet 214 consists of a perforated housing where crude oil from the production formation enters the pump. The crude oil inlet also has passageways (shown in a following illustration) for the hydraulic fluid supplied to the upper and lower crude oil pumping sections 215 and 216 respectively and for wires that supply electrical power to the motor. The hydraulic pump and control assembly 213 consists of a housing serving as a hydraulic fluid (not shown) reservoir enclosing the hydraulic pump 256, pilot operated directional control valve 255, a pump inlet 248, a hydraulic fluid outlet 250 supplying pressurized hydraulic fluid to the lower crude oil pumping section 215 through a connection 254 to the passageway in the crude oil inlet 212, and a hydraulic fluid outlet 249 supplying pressurized hydraulic fluid to the upper crude oil pumping section 216 through piping 251 (shown cutoff) through a passageway (not shown) in the crude oil inlet 212. The hydraulic pump 256 is mounted on a plate 257. The hydraulic pump and control assembly 213 is connected to the motor adapter 212 by pins soldered in place after the motor adapter is connected to the motor. The motor adapter 212 connects the hydraulic pump and control assembly 213 to the motor and seals between the two parts. The motor adapter is connected to the motor studs 260 by cylindrical nuts each with a hex socket in the top end for tightening. A coupling 247 is used to connect the hydraulic pump 256 to the motor shaft 261.

Figure 25:
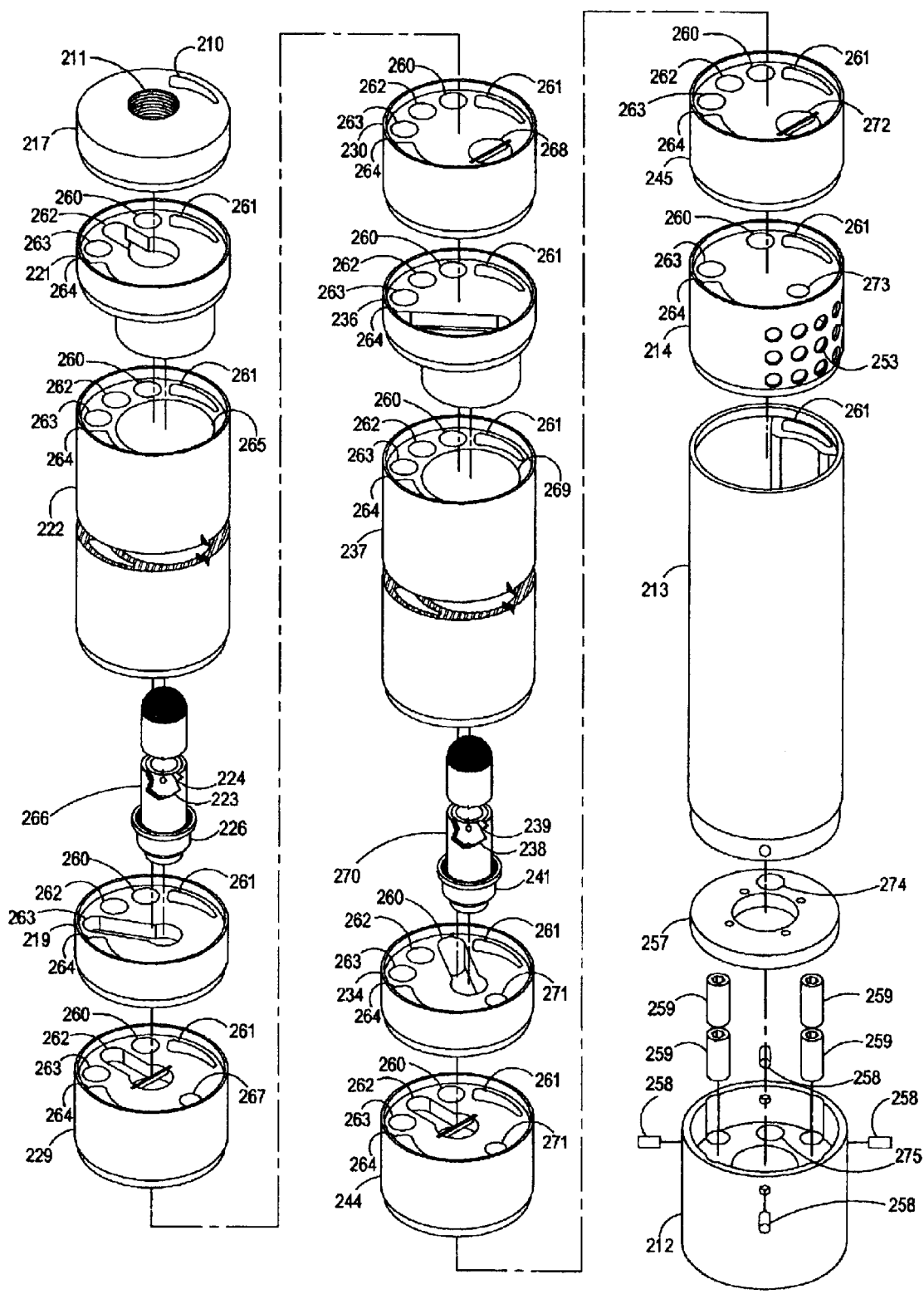
FIG. 25 is an exploded three-dimensional view of the hydraulically operated crude oil pump housing identifying the features of the parts passageways in which the fluids flow in accordance with the present invention.

FIG. 25 provides an exploded view of the components of the hydraulically operated crude oil pump 208 housing to identify the passageways in accordance with the present invention. The housing parts are to be brazed together where they will not require separation after initial assembly and soldered at a lower temperature with the bladder installed where the housing is to be separated by reheating for repair, such as replacement of the bladders. The pump cap 217 provides the threaded crude oil outlet 211 for connection to the piping (not shown) that will take the crude oil to the surface during operation. A passageway 210 is provided for electrical wiring that supplies power to the electrical motor. The upper crude oil pump housing top 221 is provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, and for the crude oil inlet 264 to the upper crude oil pumping section. The upper crude oil pump housing 222 is also provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, and for the crude oil inlet 264 to the upper crude oil pumping section, and a cylindrical cavity 265 into which the bladder assembly 266 is inserted. The hydraulic fluid inlet adapter 219 is also provided with passageways for hydraulic fluid 260 supplied to operate the lower crude oil pumping section, for the electrical wiring 261 to the motor, for the crude oil outlet 262, for the hydraulic fluid 263 with a horizontal channel to direct the hydraulic fluid to the center of the bladder assembly to operate the upper crude oil pumping section, and for the crude oil inlet 264 to the upper crude oil pumping section. The outlet checkvalve 229 housing is also provided with passageways for hydraulic fluid 260 supplied to operate the lower crude oil pumping section, for the electrical wiring 261 to the motor, for the crude oil outlet 262 with a channel connecting the outlet check ball cavity with the side outlet, for the hydraulic fluid 263 supplied to operate the upper crude oil pumping section, and for the crude oil inlet 267 to the upper crude oil pumping section. The inlet checkvalve housing 230 is also provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, for the crude oil inlet 264 to the upper crude oil pumping section, and crude oil inlet cavity 268 for the inlet check ball. The lower crude oil pump housing top 236 is provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, and for the crude oil inlet 264 with a channel connecting the side passage to the crude oil inlet to the upper crude oil pumping section below the inlet check ball housed in the inlet checkvalve housing 230. The lower crude oil pump housing 237 is also provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, and for the crude oil inlet 264 to the upper crude oil pumping section, and a cylindrical cavity 269 into which the bladder assembly 270 is inserted. The hydraulic fluid inlet adapter 234 is also provided with passageways for hydraulic fluid 260 with a horizontal channel to direct the hydraulic fluid to the center of the bladder assembly 270 to operate the lower crude oil pumping section, for the electrical wiring 261 to the motor, for the crude oil outlet 262, for the hydraulic fluid 263 to operate the upper crude oil pumping section, for the crude oil inlet 264 to the upper crude oil pumping section, and for the crude oil inlet 271 to the lower crude oil pumping section. The outlet checkvalve 244 housing is also provided with passageways for hydraulic fluid 260 supplied to operate the lower crude oil pumping section, for the electrical wiring 261 to the motor, for the crude oil outlet 262 with a channel connecting the outlet check ball cavity with the side outlet, for the hydraulic fluid 263 supplied to operate the upper crude oil pumping section, and for the crude oil inlet 264 to the upper crude oil pumping section. The inlet checkvalve 245 housing is also provided with passageways for hydraulic fluid 260 supplied to operate the lower crude oil pumping section, for the electrical wiring 261 to the motor, for the crude oil outlet 262, for the hydraulic fluid 263 supplied to operate the upper crude oil pumping section, for the crude oil inlet 264 to the upper crude oil pumping section, and crude oil inlet cavity 272 for the inlet check ball. The crude oil inlet 214 from the production formation to the pump through perforations 253 is also provided with passageways for hydraulic fluid 260 supplied to operate the lower crude oil pumping section, for the electrical wiring 261 to the motor, for the hydraulic fluid 263 supplied to operate the upper crude oil pumping section, for the crude oil inlet 264 to the upper crude oil pumping section, and crude oil inlet 273 to the lower crude oil pumping section. The hydraulic pump and control 213 housing is also provided with a passageway for the electrical wiring 261 to the motor. The hydraulic pump mounting plate 257 is also provided with a passageway for the electrical wiring 274 to the motor. The electric motor adapter 212 is also provided with a passageway for the electrical wiring 275 to the motor. The cylindrical nuts 259 are screwed on the motor studs (not shown) to attach the pump to the motor. Pins 258 are used to attach the hydraulic pump and control 213 housing to the electric motor adapter 212.

Figure 26:
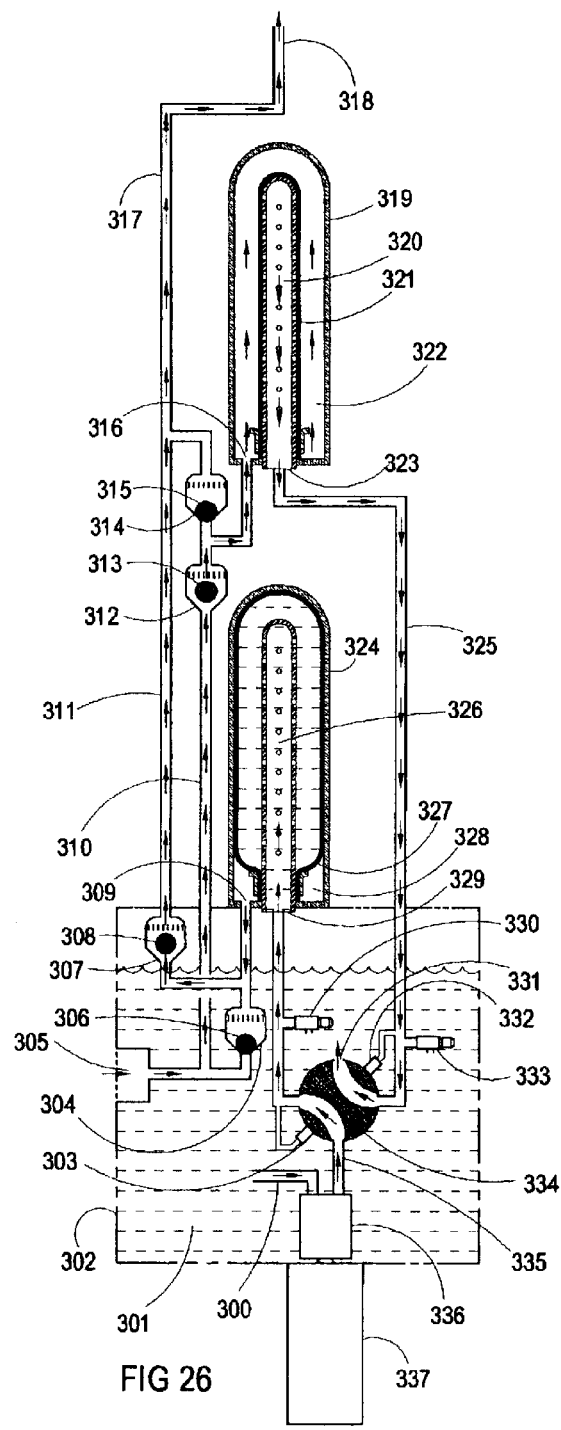
FIGS. 26 and 27 are schematic illustrations of the pumping operation of the hydraulically operated crude oil pump of FIG. 19 in accordance with the present invention.
Figure 27:
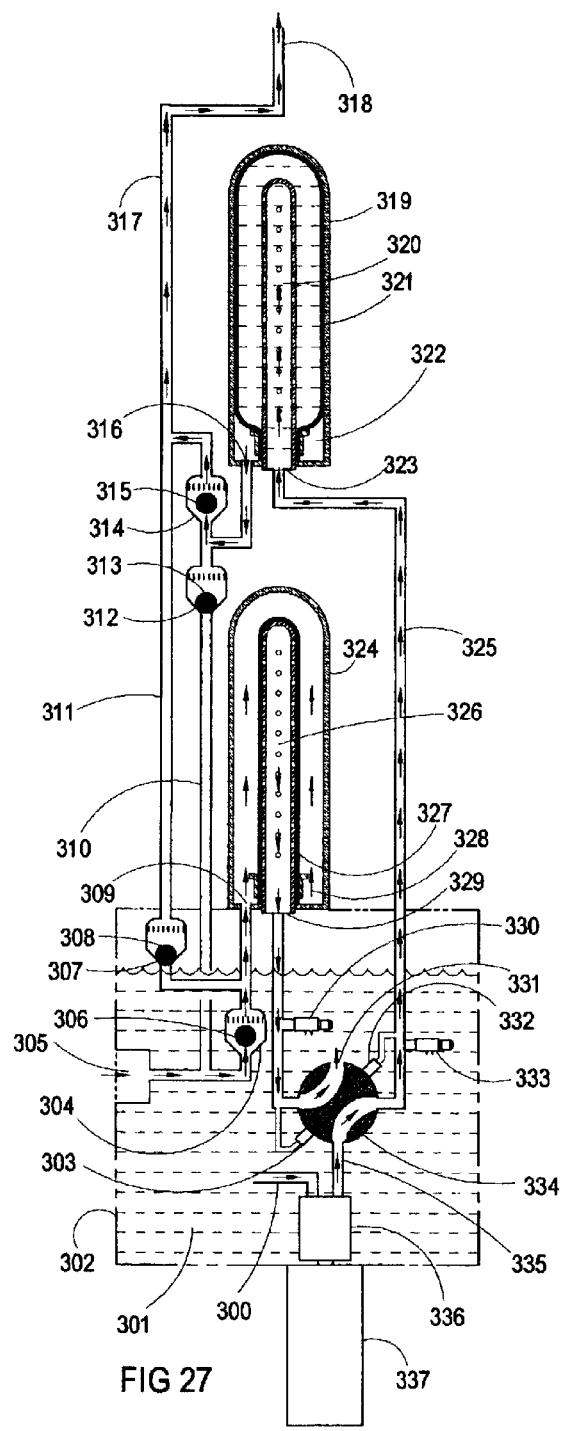

FIGS. 26 and 27 depict in schematic illustrations flow diagrams of the pumping operation of the hydraulically operated crude oil pump in accordance with the present invention. FIG. 26 provides a flow diagram of the pump with crude oil being expelled from the lower crude oil pumping section and crude oil being drawn from the underground formation into the upper crude oil pumping section. FIG. 27 provides a flow diagram of the pump with crude oil being expelled from the upper crude oil pumping section and crude oil being drawn from the underground formation into the lower crude oil pumping section. The hydraulically operated crude oil pump consists of an upper crude oil pumping section, a lower crude oil pumping section, and a hydraulic pump and controls driven by an electric motor. The upper crude oil pumping section consists of a bladder 321, an internal bladder space 320 for hydraulic fluid, a crude oil pump housing 319, a space 322 between the bladder 321 and the pump housing 319 to draw the crude oil from the underground production formation, a crude oil inlet checkvalve 312, a crude oil outlet checkvalve 314, and associated piping or passageways. The lower crude oil pumping section consists of a bladder 327, an internal bladder space 326 for hydraulic fluid, a crude oil pump housing 324, a space 328 between the bladder 327 and the pump housing 324 to draw the crude from the underground production formation, a crude oil inlet checkvalve 304, a crude oil outlet checkvalve 307, and associated piping or passageways. The upper and lower crude oil pumping sections have a common oil inlet 305 from the production formation and a common crude oil outlet 318 to the piping (not shown) that carries the crude oil to the surface. The hydraulic pump and controls consist of a hydraulic pump 336 driven by an electric motor 337, a hydraulic fluid reservoir 302 containing the hydraulic fluid 301, a pilot operated directional control valve 334 with pilot valves 303 and 331 connected to sense pressure in the lower and upper hydraulic fluid supply lines respectively, pressure relief valves 330 and 333 in the lower and upper hydraulic fluid supply lines respectively, and associated piping or passageways. Referring to FIG. 26, during operation the hydraulic pump 336 draws hydraulic fluid 301 from the hydraulic reservoir 302, increases the pressure and pumps the fluid through the directional control valve 334 and into the internal space 326 of the lower crude oil pumping section bladder 327 through the bladder inlet-outlet port 329. As hydraulic fluid fills the internal space 326 of the lower bladder 327, crude oil is expelled from the space 328 inside the crude oil pump housing 324 by the expanding bladder 327. The expelled crude oil flows out the pump housing 324 through inlet-outlet port 309, lifts the outlet check ball 308, flows up piping (passageways) 311 and 317, and exits the pump through outlet 318. While the hydraulic pump is supplying fluid to the lower crude oil pumping section, the hydraulic directional control valve 334 opens the passageway from the internal space 320 of upper crude oil pumping section bladder 321 to the hydraulic fluid reservoir to release the fluid pressure inside the bladder 321. When hydraulic fluid pressure is removed from inside the upper bladder, its elastomer (rubber like) material causes it to collapse and force the hydraulic fluid to flow out the internal space 320 of the upper bladder 321 through inlet-outlet port 323, through piping 325, and through the directional control valve outlet 331 into the hydraulic fluid reservoir 302. The collapsing upper bladder 321 also causes a vacuum to form in the space 322 outside the bladder 321 and draws crude oil from the production formation. The crude oil drawn enters through the pump inlet 305, flows up the piping (passageways) 310, lifts the inlet check ball 313 to the upper crude oil pumping section, and flows into the space 322 through inlet-outlet port 316. As the expanding bladder 327 in the lower crude oil pumping section is forced against the internal surface of the pump housing 324 hydraulic fluid pressure continues to increase beyond that required to lift the crude oil to the surface. When the hydraulic fluid pressure reaches a level preset in the directional control valve 334, the pilot valve 303 forces the valve 334 to change the hydraulic fluid flow direction as illustrated in FIG. 27. Referring to FIG. 27, the hydraulic pump 336 draws hydraulic fluid 301 from the hydraulic reservoir 302, increases the pressure and pumps the fluid through the directional control valve 334, through piping (passageways) 325 and into the internal space 320 of the upper crude oil pumping section bladder 321 through the bladder inlet-outlet port 323. As hydraulic fluid fills the internal space 320 of the upper bladder 321, crude oil is expelled from the space 322 inside the crude oil pump housing 319 by the expanding bladder 321. The expelled crude oil flows out the pump housing 319 through inlet-outlet port 316, lifts the outlet check ball 315, flows up piping (passageways) 317, and exits the pump through outlet 318. While the hydraulic pump is supplying fluid to the upper crude oil pumping section, the hydraulic directional control valve 334 opens the passageway from the internal space 326 of lower crude oil pumping section bladder 327 to the hydraulic fluid reservoir to release the fluid pressure inside the lower bladder 327. When hydraulic fluid pressure is removed from inside the lower bladder 327, its elastomer (rubber like) material causes it to collapse and force the hydraulic fluid to flow out of the internal space 326 of the lower bladder 327 through inlet-outlet port 329 and through the directional control valve outlet 331 into the hydraulic fluid reservoir 302. The collapsing lower bladder 327 also causes a vacuum to form in the space 328 outside the bladder 327 and draws crude oil from the production formation. The crude oil drawn enters through the pump inlet 305, lifts the inlet check ball 306 to the lower crude oil pumping section, and flows into the space 328 through inlet-outlet port 309. As the expanding bladder 321 in the upper crude oil pumping section is forced against the internal surface of the pump housing 319 hydraulic fluid pressure continues to increase beyond that required to lift the crude oil to the surface. When the hydraulic fluid pressure reaches a level preset in the directional control valve 334, the pilot valve 332 forces the valve 334 to change the hydraulic fluid flow direction, again as illustrated in FIG. 26.

Figure 28:
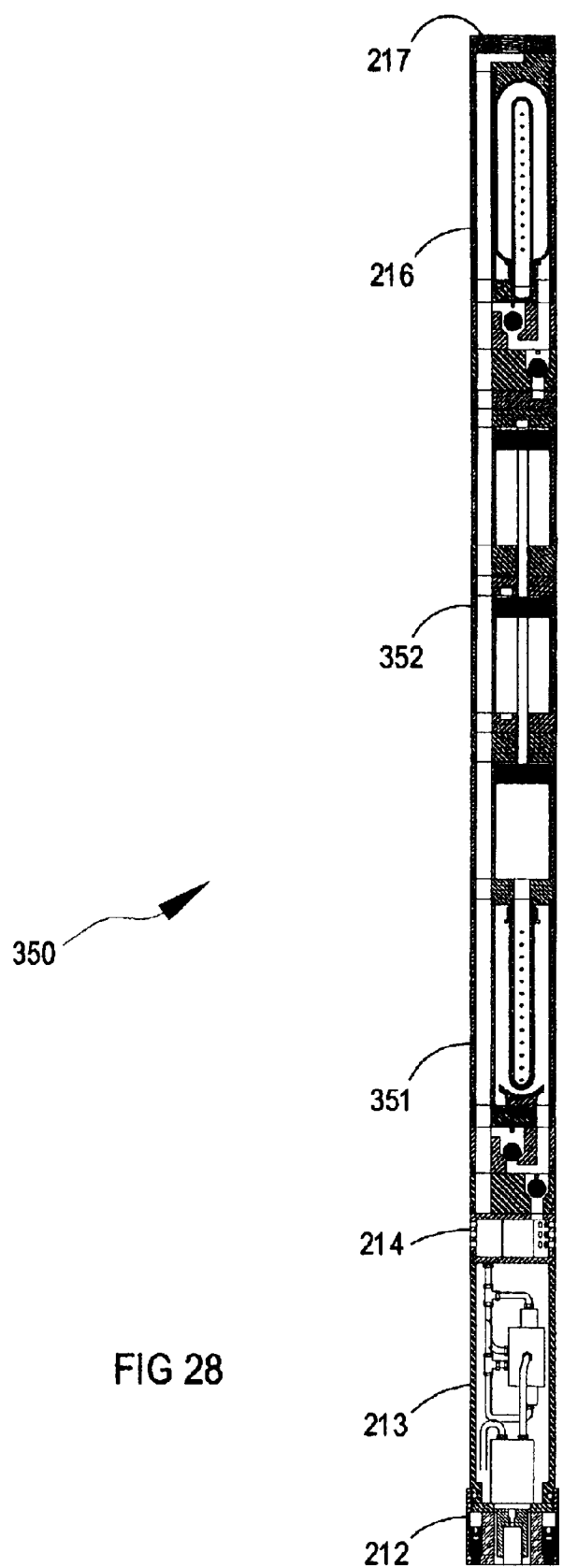
FIG. 28 is a sectional view of a second embodiment of the hydraulically operated crude oil pump employing a double acting hydraulic cylinder to pressurize one of the crude oil pumping bladders by injecting hydraulic fluid inside the bladder and at the same time drawing hydraulic fluid from inside the second bladder by suction to force its collapse when operating in deep wells with elevated temperatures that may affect the ability of the bladder elastomer material to collapse on its own.

FIG. 28 depicts a vertical cross-sectional view of another embodiment of the hydraulically operated crude oil pump 350 employing a double acting hydraulic cylinder to operate the crude oil pumping bladders by injecting hydraulic fluid in the first bladder and, at the same time, drawing hydraulic fluid from inside the second bladder by suction to force its collapse when operating in deep wells with elevated temperatures that could affect the ability of the bladder elastomer (rubber like) materials to collapse on its own in accordance with the present invention. The hydraulic operated crude oil pump 350 consists of a pump cap 217, an upper crude oil pumping section 216, a double acting hydraulic cylinder section 352, a lower crude oil pumping section 351, a crude oil inlet 214 where the crude oil enters the pump, a hydraulic pump and control valve assembly 213, and an electric motor adapter 212. The entire pump is limited in diameter by the inside diameter of the casing into which it is to be installed. The predominant size casing used in the United States has a 4-inch inside diameter, therefore, the pumps or other equipment to be used down the well must be able to be inserted inside the casing and be driven through bends in the casing and through accumulated tar and corrosion that may be attached to the inside diameter.

Figure 32:
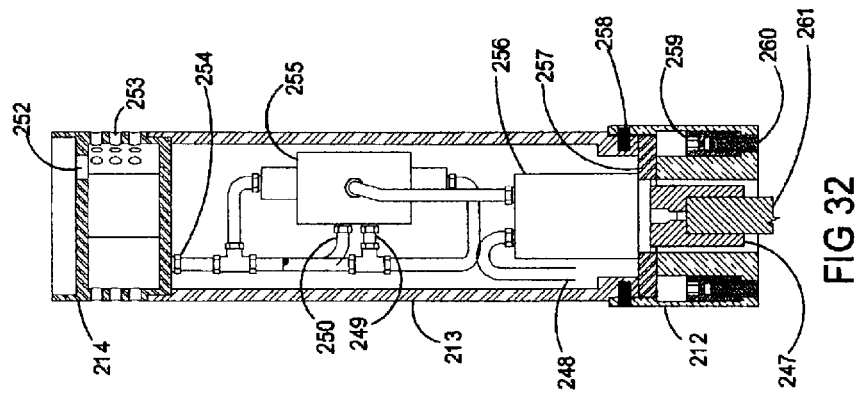
FIGS. 29–32 are enlarged cross-sectional views of the second embodiment of the hydraulically operated crude oil production pump of FIG. 28 identifying system components in accordance with the present invention.
Figure 31:
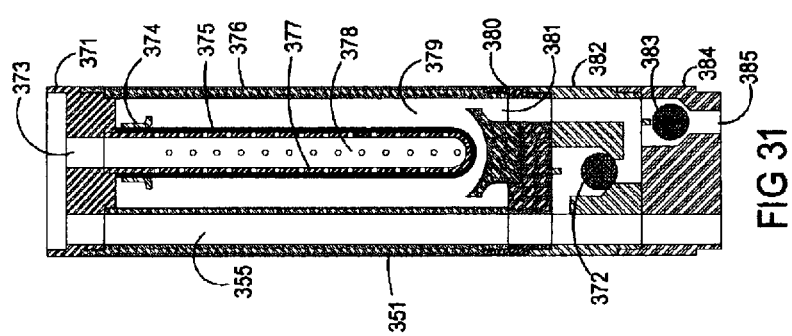
Figure 30:
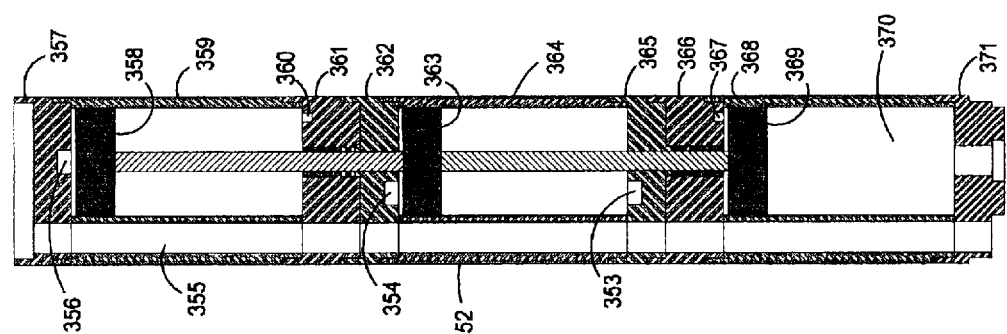
Figure 29:
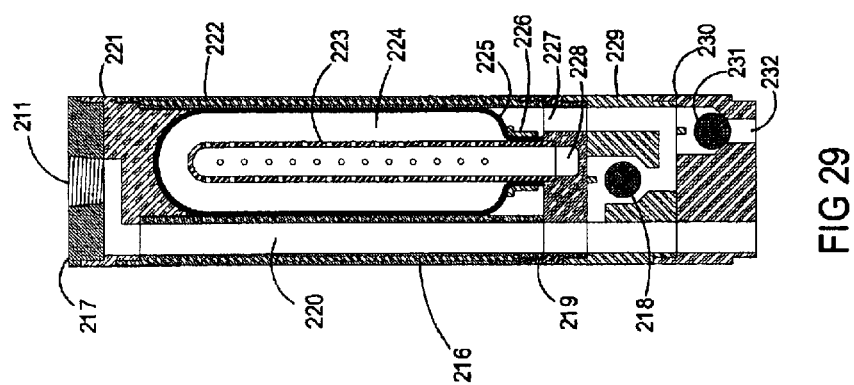

FIGS. 29–32 provide enlarged cross-sectional views of the various components of the hydraulically operated crude oil pump 350. The pump cap 217 and the upper crude oil pumping section 216 in FIG. 29 and the crude oil inlet 214, the hydraulic pump and control valve assembly 213, and the electric motor adapter 212 in FIG. 32 are the same as described in preceding discussions and are hereby incorporated herein by reference. Referring to FIG. 30, the double acting hydraulic cylinder section generally consists of three cylinders 359, 364, and 368 housing three interconnected pistons 358, 363, and 369. Hydraulic fluid under pressure from the hydraulic pump 256 is alternately applied to each side of the center piston 363. The center piston moves and drives the other two pistons 358 and 369 where the hydraulic fluid in the upper cylinder 359 is forced out to inflate the upper bladder 225 (FIG. 29) and the hydraulic fluid is drawn from the lower bladder 379 (FIG. 31) back into the lower cylinder 368 to deflate the bladder 375. The process is then reversed where the lower bladder 375 is inflated and the upper bladder 225 is deflated. The operation of the hydraulically operated crude oil pump 250 is described in detail in the following discussions of FIGS. 33 and 34. More specifically, the double acting hydraulic cylinder section 352 of the hydraulically operated crude oil pump 350 consists of an upper cylinder 359, an upper end cap 357 for the upper cylinder 359, a lower end cap 361 for the upper cylinder 359 with shaft seals and a bearing insert, a middle cylinder 364, an upper end cap 362 for the middle 364, a lower end cap 365 for the middle cylinder 364, a lower cylinder 368, an upper end cap 366 for the lower cylinder 368 with shaft seals and a bearing insert, and a lower end cap 371 for the lower cylinder 368 which also serves as the end cap of the lower crude oil pumping section and duplicated in FIG. 31. Hydraulic fluid ports 353 and 354 are connected through passageways to the hydraulic directional control valve 255 (FIG. 32) to hydraulic fluid pressure alternately to each side of the center piston 363. Hydraulic fluid port 356 is connected through a passageway with port 228 (FIG. 29) to the internal space 224 of upper bladder 225. Port 360 in the upper cylinder 359 space below piston 358 is connected through a passageway to port 367 in the lower cylinder 368 space above piston 369 to allow air to flow between the two cylinders when the pistons 358 and 369 move. The entire double acting hydraulic cylinder section 352 has a crude oil passageway 355 to allow crude oil to flow from the lower crude oil pumping section 351 through to the pump outlet. Referring to FIG. 31, the lower crude oil pumping section 351 consists of a lower pump housing 376 into which the crude oil is drawn from the formation then expelled to flow to the surface, an expandable bladder 375 of elastomer (rubber like) material to separate the crude oil outside the bladder 375 from the hydraulic fluid inside the bladder 375 used to operate the pump, a perforated bladder internal support 377, a bladder retainer 374, a top housing adapter 371 with a hydraulic fluid passageway 373, a crude oil inlet-outlet passageway 381, a crude oil outlet checkvalve 382 with the outlet check ball 372, and an inlet checkvalve 384 with the inlet check ball 383. During operation, the bladder 375 is inflated by applying hydraulic pressure inside the bladder 375 through the hydraulic fluid inlet 373 and the perforated internal bladder support 377. The inflated bladder 375 expels the crude oil in the space 379 outside the bladder 375 through the crude oil passageway 381, lifts the outlet check ball 372, and flows up the crude oil passageway 355 to the pump outlet 211 (FIG. 29). When hydraulic fluid pressure is removed from inside the bladder 375 it collapses and draws crude oil from the production formation through the inlet 385 lifting the inlet check ball 383 and flows through the crude oil passageway 381 into the space 379 outside the bladder 375. A detailed description of the pump operation is provided in the discussions of FIGS. 33 and 34.

Figure 33:
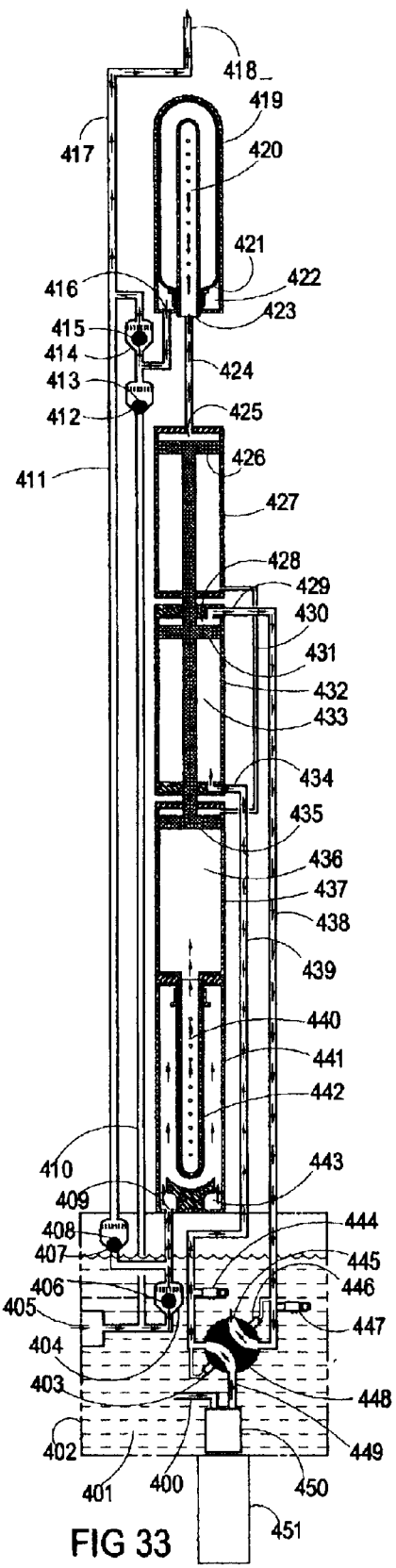
FIGS. 33 and 34 are schematic illustrations of the pumping operation of the second embodiment of the hydraulically operated crude oil pump in accordance with the present invention.
Figure 34:
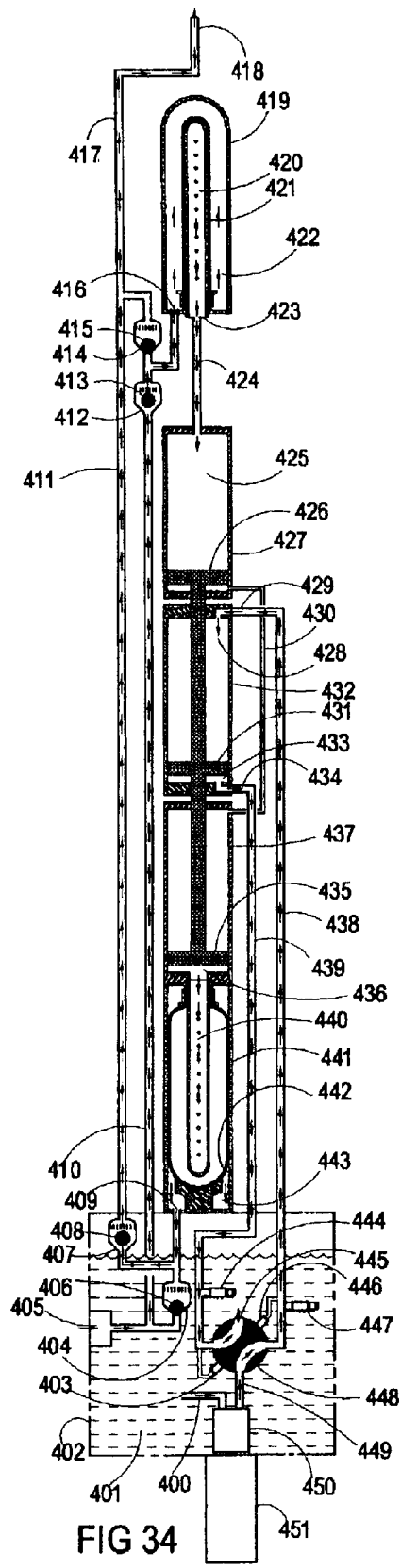

FIGS. 33 and 34 depict in schematic illustrations flow diagrams of the pumping operation of the second embodiment of the hydraulically operated crude oil pump 350 in accordance with the present invention. FIG. 33 provides a flow diagram of the hydraulically operated crude oil pump 350 with crude oil being expelled from the upper crude oil pumping section and crude oil being drawn from the underground formation into the lower crude oil pumping section. FIG. 34 provides a flow diagram of the pump with crude oil being expelled from the lower crude oil pumping section and crude oil being drawn from the underground formation into the upper crude oil pumping section. The hydraulically operated crude oil pump 350 consists of an upper crude oil pumping section, a double acting hydraulic cylinder section, a lower crude oil pumping section, and a hydraulic pump and controls driven by an electric motor. The upper crude oil pumping section consists of a bladder 421, an internal bladder space 420 for hydraulic fluid, a crude oil pump housing 419, a space 422 between the bladder 421 and the pump housing 419 to draw the crude oil from the underground production formation, a crude oil inlet checkvalve 412, a crude oil outlet checkvalve 414, and associated piping or passageways. The double acting hydraulic cylinder section generally consists of three cylinders 427, 432, and 437 housing three interconnected pistons 426, 431, and 435. Hydraulic fluid pressure from the hydraulic pump 450 is alternately applied to each side of the center piston 431. The center piston 431 moves and drives the other two pistons 426 and 435 and forces the hydraulic fluid out of the upper cylinder 427 to inflate the upper bladder 421 and draws hydraulic fluid out of the lower bladder 442 causing it to collapse. The process is then reversed where the lower bladder 442 is inflated and the upper bladder 421 is deflated by the action of the double acting cylinder section. The lower crude oil pumping section consists of a bladder 442, an internal bladder space 440 for hydraulic fluid, a crude oil lower pump housing 441, a space 443 between the bladder 442 and the pump housing 441 to draw the crude from the underground production formation, a crude oil inlet checkvalve 404, a crude oil outlet checkvalve 407, and associated piping or passageways. The upper and lower crude oil pumping sections have a common oil inlet 405 from the production formation and a common crude oil outlet 418 to the piping (not shown) that carries the crude oil to the surface. The hydraulic pump and controls consist of a hydraulic pump 450 driven by an electric motor 451, a hydraulic fluid reservoir 402 containing the hydraulic fluid 401, a pilot operated directional control valve 448 with pilot valves 403 and 446 connected to sense pressure in the lower and upper hydraulic fluid supply lines respectively, pressure relief valves 444 and 447 in the lower and upper hydraulic fluid supply lines respectively, and associated piping or passageways. Referring to FIG. 33, during operation the hydraulic pump 450 draws hydraulic fluid 401 from the hydraulic reservoir 402, increases the pressure and pumps the fluid through the directional control valve 448 and into the space 433 below the center piston 431 to move all three pistons 426, 431, and 435 upward. As the three pistons move, air is transferred between the space below piston 426 in the upper pump housing 427 and the space above piston 435 in the lower pump housing 437 through piping or passageway 430. The upper piston 426 drives the hydraulic fluid from above the piston 426 into the internal space 420 of the upper crude oil pumping section bladder 421 through the bladder inlet-outlet port 423. As hydraulic fluid fills the internal space 420 of the upper bladder 421, crude oil is expelled from the space 422 inside the crude oil pump housing 419 by the expanding bladder 421. The expelled crude oil flows out the pump housing 419 through inlet-outlet port 416, lifts the outlet check ball 415, flows up piping (passageways) 417, and exits the pump through outlet 418. While the hydraulic pump is supplying fluid to the upper crude oil pumping section, the hydraulic directional control valve 448 opens the passageway from the space 428 above the center piston 431 to the hydraulic fluid reservoir to release the fluid pressure above the piston and allow it to move upward. The hydraulic fluid from above the center piston 431 flows through inlet-outlet port 429, through piping 438, and through the directional control valve outlet 445 into the hydraulic fluid reservoir 402. The lower piston 435 draws the hydraulic fluid from the internal space 440 of the lower bladder 442 into the space 436 below piston 435 as it moves upward and causes the lower bladder 442 to collapse. The collapsing lower bladder 442 also causes a vacuum to form in the space 443 outside the bladder 442 and draws crude oil from the production formation. The crude oil drawn enters through the pump inlet 405, lifts the inlet check ball 406 to the lower crude oil pumping section, and flows into the space 443 through inlet-outlet port 409. As the expanding bladder 421 in the upper crude oil pumping section is forced against the internal surface of the pump housing 419 hydraulic fluid pressure in the bladder 421 and the space 433 below the center piston 431 continues to increase beyond that required to lift the crude oil to the surface. When the hydraulic fluid pressure reaches a level preset in the directional control valve 448, the pilot valve 403 forces the valve 448 to change the hydraulic fluid flow direction as illustrated in FIG. 34. Referring to FIG. 34, during operation the hydraulic pump 450 draws hydraulic fluid 401 from the hydraulic reservoir 402, increases the pressure and pumps the fluid through the directional control valve 448 and into the space 428 above the center piston 431 to move all three pistons 426, 431, and 435 downward. As the three pistons move, air is transferred between the space below piston 426 in the upper pump housing 427 and the space above piston 435 in the lower pump housing 437 through piping or passageway 430. The lower piston 435 drives the hydraulic fluid from below the piston 435 into the internal space 440 of the lower crude oil pumping section bladder 442 through the bladder inlet-outlet port 436. As hydraulic fluid fills the internal space 440 of the lower bladder 442, crude oil is expelled from the space 443 inside the crude oil pump housing 441 by the expanding bladder 442. The expelled crude oil flows out the pump housing 441 through inlet-outlet port 409, lifts the outlet check ball 408, flows up piping (passageways) 411 and 417, and exits the pump through outlet 418. While the hydraulic pump is supplying fluid to the lower crude oil pumping section, the hydraulic directional control valve 448 opens the passageway from the space 433 below the center piston 431 to the hydraulic fluid reservoir to release the fluid pressure above the piston and allow it to move upward. The hydraulic fluid from below the center piston 431 flows through inlet-outlet port 434, through piping 439, and through the directional control valve outlet 445 into the hydraulic fluid reservoir 402. The upper piston 426 draws the hydraulic fluid from the internal space 420 of the upper bladder 421 into the space 425 above piston 426 as it moves downward and causes the upper bladder 421 to collapse. The collapsing upper bladder 421 also causes a vacuum to form in the space 422 outside the bladder 421 and draws crude oil from the production formation. The crude oil drawn enters through the pump inlet 405, flows up the piping or passageway 410, lifts the inlet check ball 412 to the upper crude oil pumping section, and flows into the space 422 through inlet-outlet port 416. As the expanding bladder 442 in the lower crude oil pumping section is forced against the internal surface of the pump housing 441, hydraulic fluid pressure in the bladder 442 and the space 428 above the center piston 431 continues to increase beyond that required to lift the crude oil to the surface. When the hydraulic fluid pressure reaches a level preset in the directional control valve 448, the pilot valve 446 forces the valve 448 to change the hydraulic fluid flow direction again as illustrated in FIG. 33.

Figure 35:
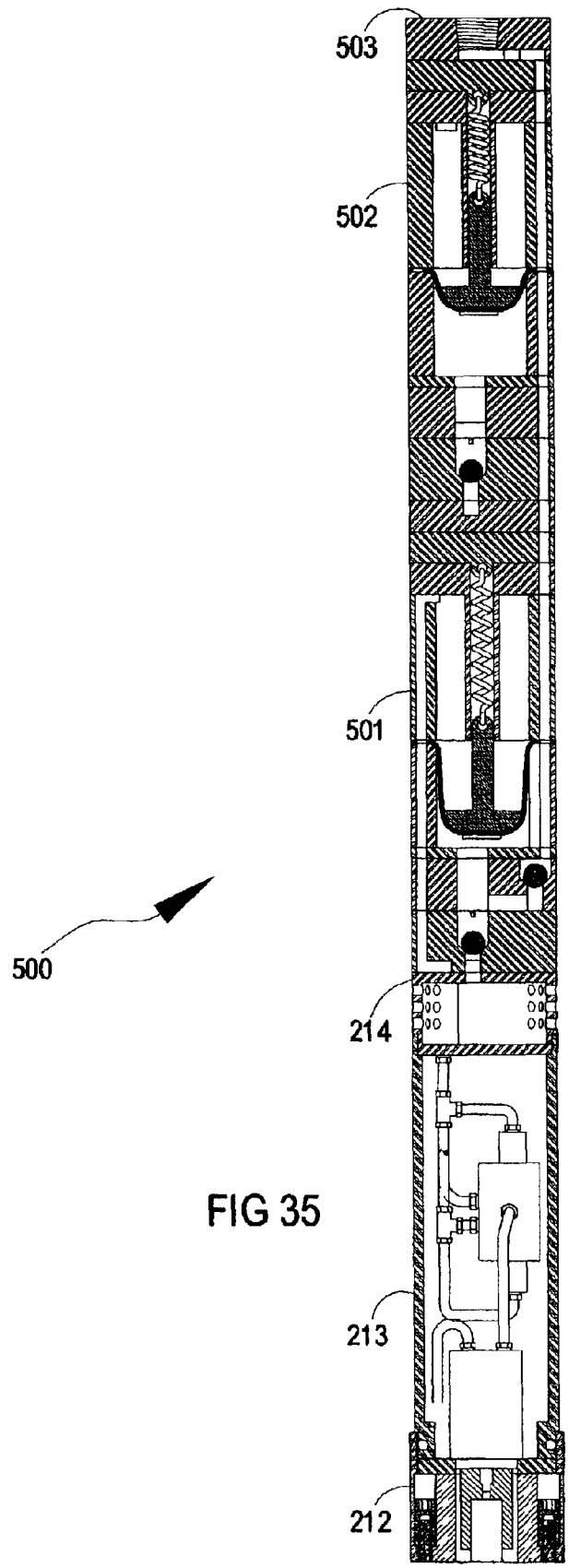
FIG. 35 is a sectional view of a third embodiment of the hydraulically operated crude oil pump employing diaphragms to replace the bladders with hydraulic pressure applied to the diaphragms to expel the crude oil from the housing into the surface piping and springs to return the diaphragms and draw the crude oil from the formation by suction in accordance with the present invention.

FIG. 35 depicts a vertical cross-sectional view of a third embodiment of the hydraulically operated crude oil pump 500 employing a diaphragm instead of a bladder as the crude oil pumping mechanism with a mechanical spring to return the diaphragm and draw the crude oil from the production formation in accordance with the present invention. The hydraulically operated crude oil pump 500 consists of a pump cap 503, and upper crude oil pumping section 502, a lower crude oil pumping section 501, a crude oil inlet 214 where crude oil enters the pump, a hydraulic pump and control valve assembly 213, and an electric motor adapter 212.

Figure 38:
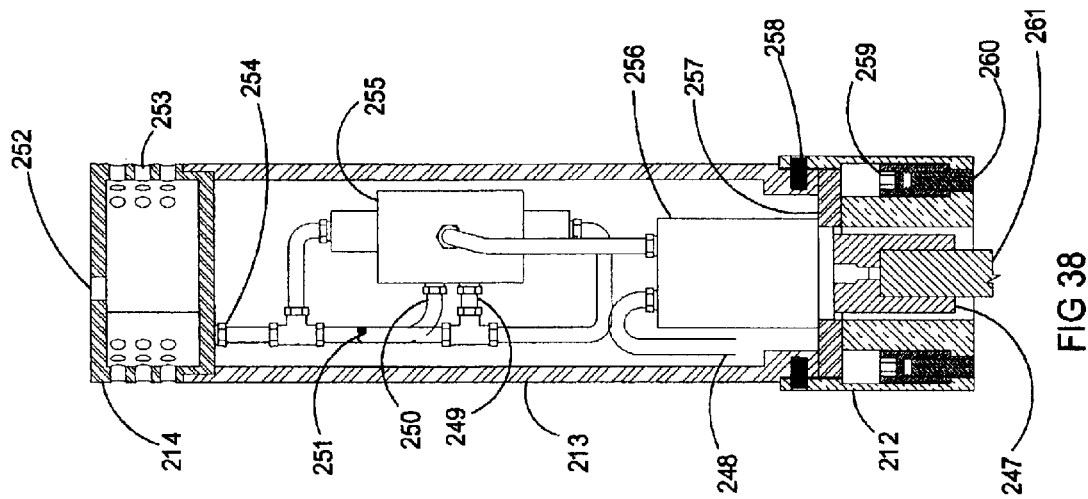
FIGS. 36–38 are enlarged cross-sectional views of the third embodiment of the hydraulically operated crude oil pump of FIG. 35 identifying system components in accordance with the present invention.
Figure 37:
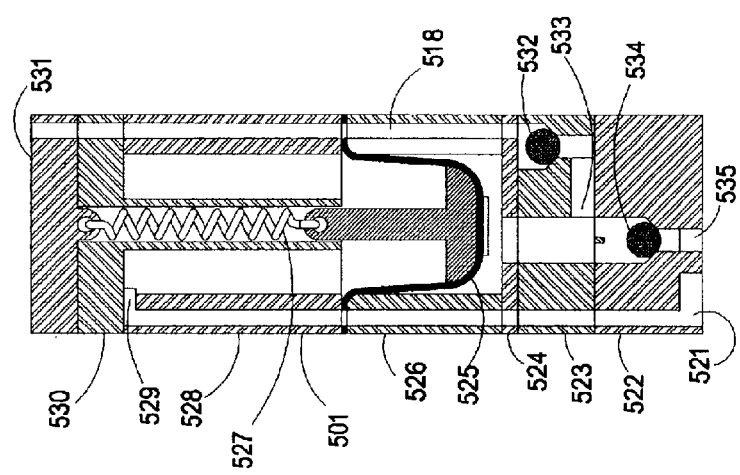
Figure 36:
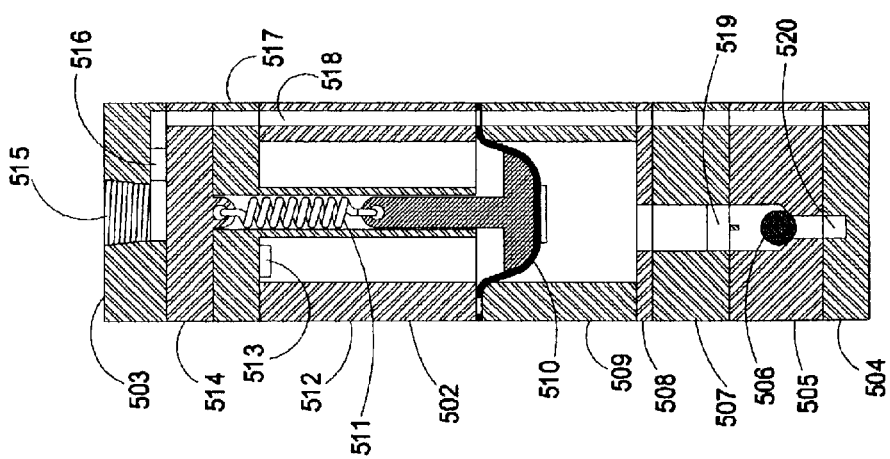

FIGS. 36–38 provide enlarged cross-sectional views of the various components of the hydraulically operated crude oil pump 500. FIG. 36 provides the cross-sectional views of the pump cap 503 and the upper crude oil pumping section 502. FIG. 37 provides the cross-sectional view of the lower crude oil pumping section 501. FIG. 38 provides cross-sectional views of the crude oil inlet 214, the hydraulic pump and control valve assembly 213, and the electric motor adapter 212 and are the same as described in the discussions of FIGS. 22–24 and are hereby incorporated herein by reference. Referring to FIG. 36, the upper crude oil pumping section 502 consists of an upper pump housing 509 into which the crude oil is drawn from the production formation then expelled to flow to the surface, a upper diaphragm 510 assembly that separates the crude oil below the diaphragm 510 from the hydraulic fluid injected above the diaphragm to operate the pump, a hydraulic fluid adapter 512 with an inlet-outlet port 513 to direct the hydraulic fluid above the diaphragm 510 during operation, a spring 511 to lift the diaphragm 510 after the crude oil has been expelled from the pump housing 509, a diaphragm guide 517 to keep the diaphragm 510 straight during operation, a spring anchor 514 to attach the upper end of the spring 511, a bottom seal plate 508 for the upper pump housing 509, a crude oil outlet checkvalve 507 with a crude oil outlet check ball (not shown in this plane) and a crude oil outlet port 518, a crude oil inlet checkvalve 505 with the inlet check ball 506, and a crude oil inlet adapter 504 with the crude oil inlet port 520. Referring to FIG. 37, the lower crude oil pumping section 501 consists of a lower pump housing 526 into which the crude oil is drawn from the production formation then expelled to flow to the surface, a lower diaphragm 525 assembly that separates the crude oil below the diaphragm 525 from the hydraulic fluid injected above the diaphragm to operate the pump, a hydraulic fluid adapter 528 with a hydraulic inlet-outlet port 529 to direct the hydraulic fluid above the diaphragm 525 during operation, a spring 527 to lift the diaphragm 525 after the crude oil has been expelled from the pump housing 526, a diaphragm guide 530 to keep the diaphragm 525 straight during operation, a spring anchor 531 to attach the upper end of the spring 527, a bottom seal plate 524 for the lower pump housing 526, a crude oil outlet checkvalve 523 with a crude oil outlet check ball 532 and a crude oil outlet port 533, a crude oil inlet checkvalve 522 with the inlet check ball 534, a crude oil inlet port 535, and a hydraulic fluid passageway 521.

Figure 39:
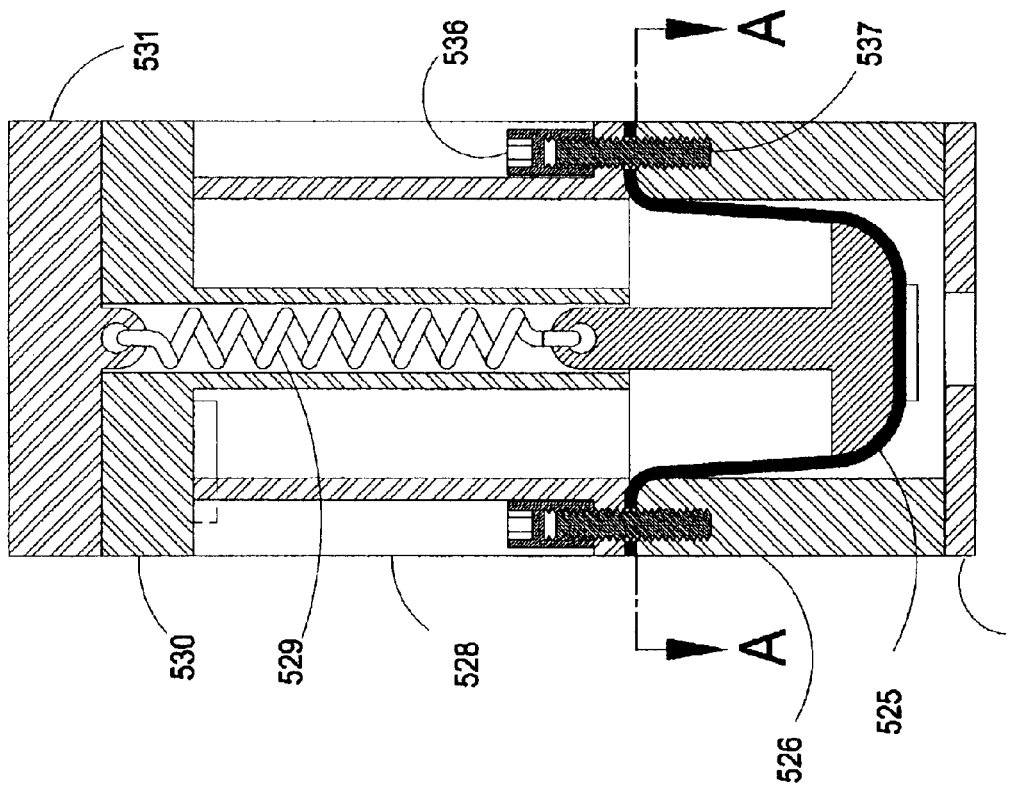
FIG. 39 depicts a vertical cross-sectional view of the lower crude oil pumping section of FIG. 37 taken in a plane to illustrate the installation of a typical diaphragm in accordance with the present invention.

FIG. 39 provides a vertical cross-sectional view of the lower crude oil pumping section rotated in a plane to show a typical diaphragm installation. Referring to FIG. 39, the diaphragm 525 assembly is installed in the pump by bolting the diaphragm 525 between the crude oil pump housing 526 and the hydraulic fluid adapter 528 with studs 537 screwed into the pump housing 526 and secured in place with cylindrical nuts 536 with a hex socket in the top of each nut for tightening with a hex wrench.

Figure 40:
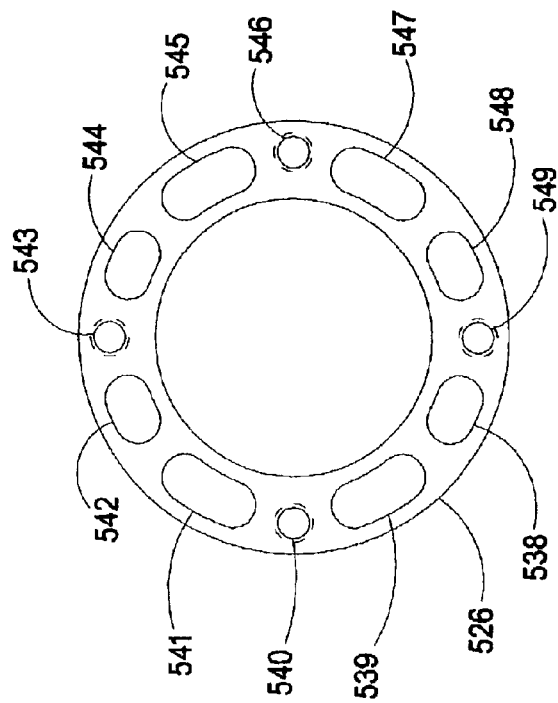
FIG. 40 depicts a horizontal cross-sectional view A—A taken from FIG. 39 to identify the fluid passageways in the housing of the hydraulically operated crude oil pump illustrated in FIGS. 35–39.

FIG. 40 provides a horizontal cross-sectional view A—A of the pump housing 526 taken from FIG. 39 to illustrate typical passageways throughout the pump for the fluids. The threaded sockets (female threads) 540, 543, 546, and 549 are for the studs 537. There are two crude oil inlet passageways 539 and 541 with only one 541 being used in the illustrated pump 500. Hydraulic fluid is supplied through passageways 538 and 542 to the lower and upper crude oil pumping sections respectively. The crude oil outlet passageways 545 and 547 take the crude oil out from the lower and upper crude oil pumping sections respectively to the pump outlet. The two additional passageways 544 and 548 are spares.

FIGS. 41 and 42 depict in schematic illustrations flow diagrams of the pumping operation of the hydraulically operated crude oil pump 500 in accordance with the present invention. FIG. 41 provides a flow diagram with crude oil being expelled from the lower crude oil pumping section and crude oil being drawn from the underground formation into the upper crude oil pumping section. FIG. 42 provides a flow diagram with crude oil being expelled from the upper crude oil pumping section and crude oil being drawn from the underground formation into the lower crude oil pumping section. The hydraulically operated crude oil pump 500 consists of an upper crude oil pumping section, a lower crude oil pumping section, and a hydraulic pump and control valve driven by an electric motor. The upper crude oil pumping section consists of a diaphragm 623, a space 622 above the diaphragm 623 for hydraulic operating fluid, a crude oil pumping housing 624, a space 626 inside the pumping housing 624 below the diaphragm 623 to draw crude oil from the underground production formation and transfer it to the surface, a crude oil inlet checkvalve 613, a crude oil outlet checkvalve 615, and associated piping or passageways. The lower crude oil pumping section consists of a diaphragm 630, a space 627 above the diaphragm 630 for hydraulic pump operating fluid, a crude oil pumping housing 631, a space 632 inside the pumping housing 631 below the diaphragm 630 to draw crude oil from the underground production formation and transfer it to the surface, a crude oil inlet checkvalve 604, a crude oil outlet checkvalve 607, and associated piping or passageways. The upper and lower crude oil pumping sections have a common oil inlet 605 from the production formation and a common crude oil outlet 620 to the piping (not shown) that carries the crude oil to the surface. The hydraulic pump and controls consist of a hydraulic pump 639 driven by an electric motor 640, a hydraulic fluid reservoir 602 containing the hydraulic fluid 601, a pilot operated directional control valve 637 with pilot valves 603 and 635 connected to sense pressure in the lower and upper hydraulic fluid supply lines respectively, pressure relief valves 633 and 636 in the lower and upper hydraulic fluid supply lines respectively, and associated piping or passageways. Referring to FIG. 41, during operation the hydraulic pump 639 draws hydraulic fluid 601 from the hydraulic reservoir 602, increases the pressure and pumps the fluid through the directional control valve 637, through piping or passageway 629, and into space 627 above the lower diaphragm 630 through the inlet-outlet port 628. As hydraulic fluid fills the space 627 above the diaphragm 630, crude oil is expelled from the space 632 inside the crude oil pump housing 631 by the moving diaphragm 630. The expelled crude oil flows out the pump housing 631 through inlet-outlet port 609, lifts the outlet check ball 608, flows up piping (passageways) 611 and 619, and exits the pump through outlet 620. While the hydraulic pump is supplying fluid to the lower crude oil pumping section, the hydraulic directional control valve 637 opens the passageway from the space 622 above the upper crude oil pumping section diaphragm 623 to the hydraulic fluid reservoir to release the fluid pressure above the diaphragm 623. When hydraulic fluid pressure is removed from above the diaphragm 623, the spring 618 lifts the diaphragm 623 and forces the hydraulic fluid to flow out the space 622 above the diaphragm 623 through inlet-outlet port 621, through piping 625, and through the directional control valve outlet 634 into the hydraulic fluid reservoir 602. The rising diaphragm also causes a vacuum to form in the space 626 below the diaphragm 623 and draws crude oil from the production formation. The crude oil drawn enters through the pump inlet 605, flows up the piping (passageways) 610, lifts the inlet check ball 614 to the upper crude oil pumping section, and flows into the space 626 through inlet-outlet port 617. As the lower diaphragm 630 in the lower crude oil pumping section is forced down against the lower surface of the pump housing 631 hydraulic fluid pressure continues to increase beyond that required to lift the crude oil to the surface. When the hydraulic fluid pressure reaches a level preset in the directional control valve 637, the pilot valve 603 forces the control valve 637 to change the hydraulic fluid flow direction as illustrated in FIG. 42. Referring to FIG. 42, the hydraulic pump 639 draws hydraulic fluid 601 from the hydraulic reservoir 602, increases the pressure and pumps the fluid through the directional control valve 637, through piping (passageways) 625, and into space 622 above the upper diaphragm 623 through inlet-outlet port 621. As hydraulic fluid fills the space 622 above the diaphragm 623, crude oil is expelled from the space 626 inside the crude oil pump housing 624 by the moving diaphragm 623. The expelled crude oil flows out the pump housing 624 through inlet-outlet port 617, lifts the outlet check ball 616, flows up piping (passageway) 619, and exits the pump through outlet 620. While the hydraulic pump is supplying fluid to the upper crude oil pumping section, the hydraulic directional control valve 637 opens the passageway from the space 627 above the lower crude oil pumping section diaphragm 630 to the hydraulic fluid reservoir to release the fluid pressure above the diaphragm 630. When hydraulic fluid pressure is removed from above the diaphragm 630, the spring 612 lifts the diaphragm 630 and forces the hydraulic fluid to flow out the space 627 above the diaphragm 630 through inlet-outlet port 628, through piping 629, and through the directional control valve outlet 634 into the hydraulic fluid reservoir 602. The rising diaphragm also causes a vacuum to form in the space 632 below the diaphragm 630 and draws crude oil from the production formation. The crude oil drawn enters through the pump inlet 605, lifts the inlet check ball 606 to the lower crude oil pumping section, and flows into the space 632 through inlet-outlet port 609. As the upper diaphragm 623 in the upper crude oil pumping section is forced down against the lower surface of the pump housing 624 hydraulic fluid pressure continues to increase beyond that required to lift the crude oil to the surface. When the hydraulic fluid pressure reaches a level preset in the directional control valve 637, the pilot valve 635 forces the control valve 637 to change the hydraulic fluid flow direction, again as illustrated in FIG. 41.

Figure 43:
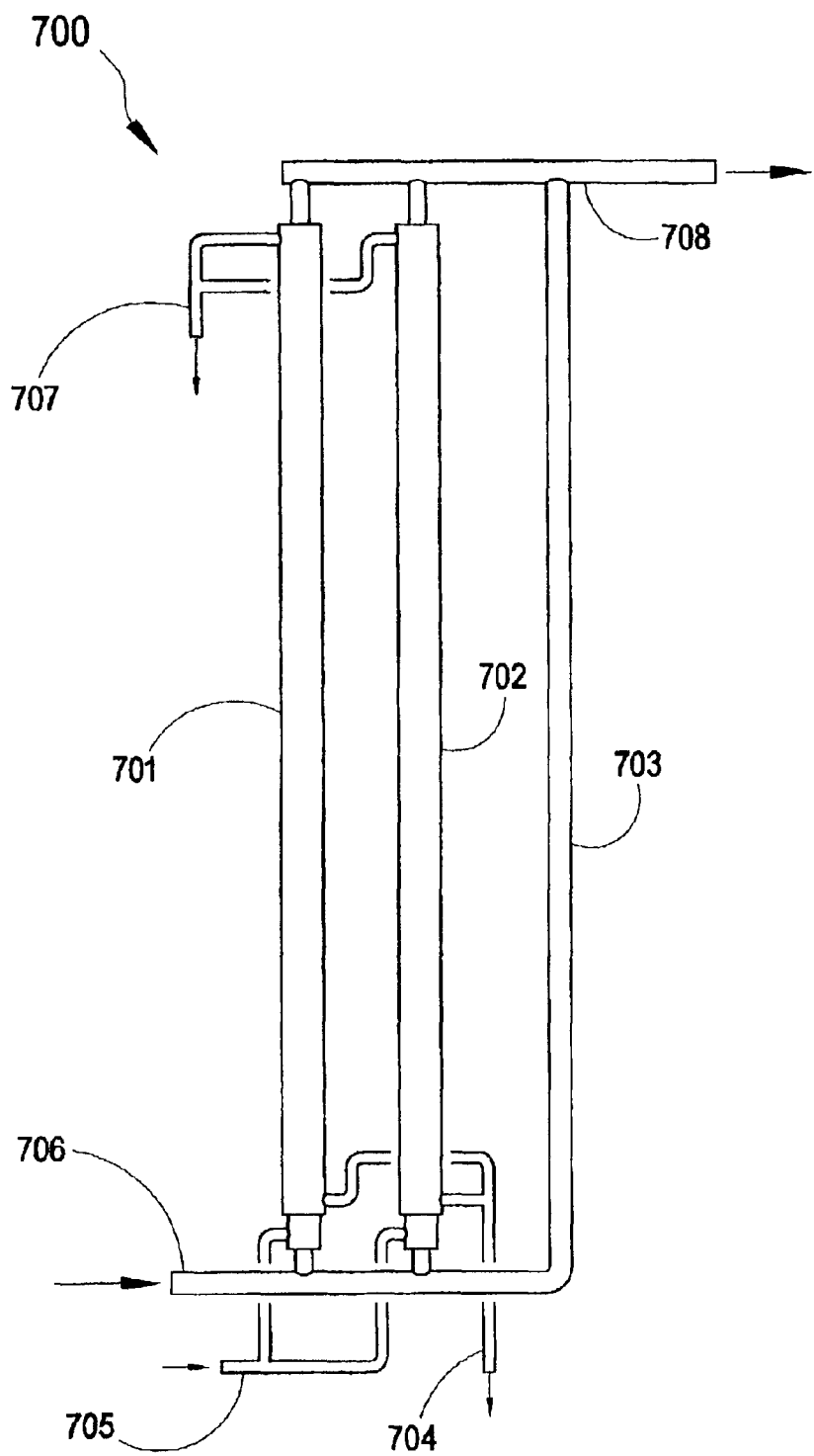
FIGS. 43–45 are fluid diagrams of a fuel gas generator system identifying major system components and illustrating the flow of fluids through the gas generator in accordance with the present invention.

FIG. 43 depicts a piping illustration of an exemplary fuel gas generator 700 to extract natural gas from the crude oil under production for fuel to operate engines used to power gas compressors and electrical generators used in the inert gas production system of FIGS. 1 and 2 in accordance with the present invention. A detailed description of the fuel gas generator is provided in the discussions of the following drawings. The fuel gas generator 700 generally consists of two gas-extracting towers 701 and 702, a bypass 703, an exhaust gas inlet 706, an exhaust gas outlet 708, a crude oil inlet 705, a fuel gas outlet 707, and a crude oil outlet 704 to return the remaining crude oil to the production tank (not shown) once the natural gas has been extracted. Referring to FIG. 43, hot exhaust gases from an engine (not shown) enter the fuel gas generator 700 through inlet 706, flow up the gas-extracting towers 701 and 702 to heat the crude oil entering through inlet 705 and separate some of the light gases similar to the cracking process used in refineries, flow out the fuel gas generator 700 through outlet 708, and enter the exhaust gas cleaning system 1 through the flue gas inlet 14 identified in FIG. 3. Excess gases not needed for the gas-extracting towers 701 and 702 are allowed to flow around the gas-extracting towers through the bypass 703. The gases extracted from the crude oil are separated from the remaining heavier part of the crude oil by gravity and exit the fuel gas generator 700 through the fuel gas outlet 707 where it flows to a container (not shown) and stored for fuel. The remaining heavier part of the crude oil separated from the light gases flows out of the fuel gas generator 700 through crude oil outlet 704 and returned to the crude oil storage tank (not shown) and mixed with the other oil from the production operation.

Figure 44:
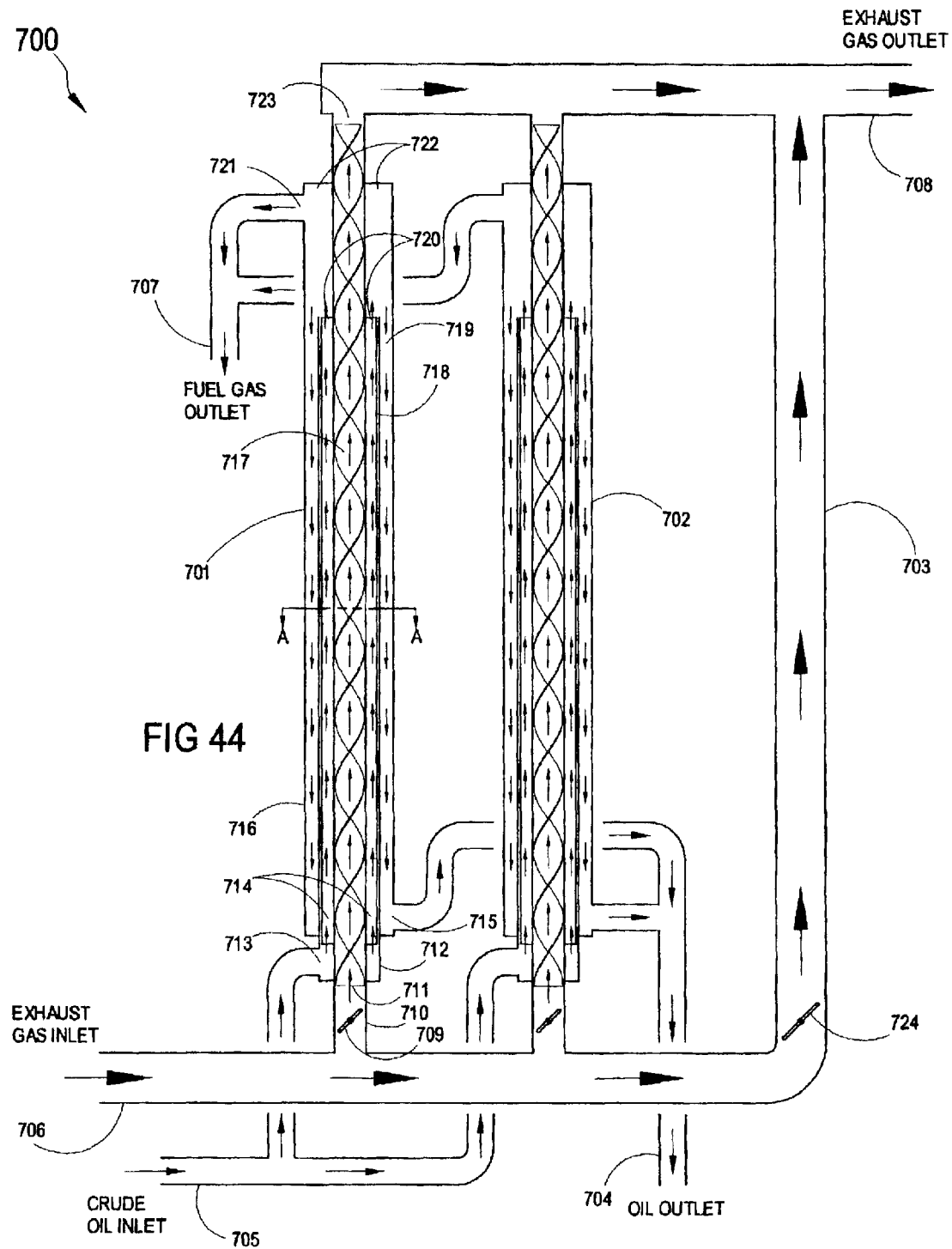
Figure 45:
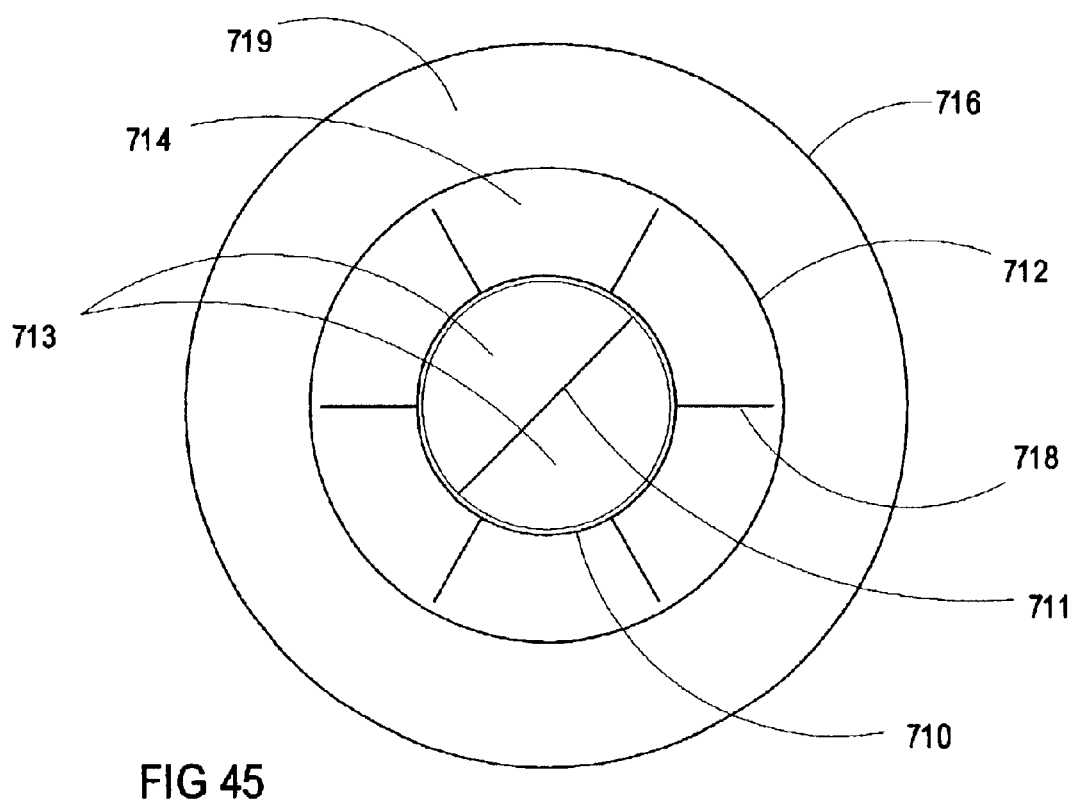

FIGS. 44 and 45 depict in a schematic illustration flow diagrams of an exemplary fuel gas generator 700 used to extract natural gas from crude oil for fuel to operate the engines used for powering compressors and electrical generators in crude oil production systems for increasing and extending production of oil by inert gas injection in accordance with the present invention. Referring to FIG. 44, the gas-extracting towers 701 and 702 illustrated are identical, and the description provided applies to both units. The illustration of two extracting towers is not intended to limit the number used in a specific application. The amount and size of the fuel gas generators used are based on the size and number of engines used in an oilfield for inert gas oil production. The fuel gas generator system 700 consists of an exhaust gas inlet 706, two gas-extracting towers 701 and 702, an-excess exhaust gas bypass 703, an exhaust gas outlet 708, a common crude oil inlet 705, a common fuel gas outlet 707, and a common oil outlet 704. Each gas-extracting tower 701 or 702 consists of an exhaust gas cylinder 710 with fins 718 attached to the outside of the exhaust gas cylinder 710 and a spiral baffle 711 inside the exhaust gas cylinder 710, a damper 709 at the lower inlet end of the exhaust gas cylinder 710, an intermediate or second cylinder 712 encasing the exhaust gas cylinder 710 and fins 718, and an outer cylinder 716 serving as the outside casing of the gas-extracting tower 701. FIG. 45 depicts a horizontal cross-sectional view A—A of the gas-extracting tower 701 taken from FIG. 44 illustrating the exhaust gas cylinder 710 with fins 718 attached to the outside circumference of exhaust gas cylinder 710, the spiral baffle 711 inside the exhaust gas cylinder 710, the intermediate cylinder 712, and the outside casing 716. The exhaust gases travel up the space 713 inside the exhaust gas cylinder 710 on each side of the spiral baffle 711. The crude oil enters the lower part of the gas-extracting tower 701 and flows up the annulus 714 in contact with the fins 718 between the exhaust gas cylinder 710 and the intermediate cylinder 712 where it is heated to separate some of the gases. The heavier oil remaining after the gases are separated flows down the annulus 719 between the intermediate cylinder 712 and the outer casing 716. Referring to FIG. 44, in operation hot exhaust gases from an engine (not shown) enters through inlet 706 and flows into the exhaust gas cylinder 710 around the damper 709 and is forced to spiral up the inside of the exhaust gas cylinder 710 by spiral baffle 711. Heat from the hot exhausted gases is conducted through the exhaust gas cylinder 710 to heat the outside of the cylinder 710 and fins 718. Crude oil enters through the bottom crude oil inlet 705 and flows into the annulus 714 through the oil inlet port 713. As the oil flows up the annulus 714 it is heated by the hot outside surface of exhaust gas cylinder 710 and the fins 718. The oil is partially cracked or separated into the light gases with the heavier part of the oil remaining a liquid as it flows up the annulus 714. The remaining heavier oil turns when it reaches the top of the intermediate cylinder 712 and flows downward into the annulus 719. The heavier oil is at its hottest point when it spills over the top of intermediate cylinder 712 and flows downward. As the heavier oil flows downward it transfers heat through the intermediate cylinder 712 to the colder oil entering at the lower end of annulus 714 to enhance the operating efficiency of the gas-extracting tower 701. The heavier oil flows out of the annulus 714 and the gas-extracting tower 701 through outlet port 715. In extreme cold weather the heat in the gas-extracting tower 701 may be prevented from escaping to the atmosphere by insulating the outside of the outer casing 716, and, when required, the flow of exhaust gases may be reversed by entering from the top and flowing downward in the exhaust gas cylinder 710 to provide the counter-flow advantage of heat transfer understood by those skilled in the art.

What is claimed is:

1. An inert gas oil production system, comprising:
   an exhaust gas processing system to purify exhaust gases before injection into an injection well;
   an injection system to deliver the purified exhaust gas from the exhaust gas processing system to a reservoir via the injection well;
   an oil production system to produce crude oil from the reservoir after the injection system delivers purified exhaust gas to the reservoir; and
   a fuel gas generator for extracting natural gas from the crude oil under production, the natural gas being useable as fuel for an engine utilized in the inert gas oil production system.

2. The inert gas oil production system of claim 1, in which the exhaust gas processing system further comprises:
   an exhaust gas cooling system;
   a gas compressor to receive the exhaust gas from the cooling system;
   a two stage exhaust gas washing system to remove nitrogen oxides and exhaust water vapor from the exhaust gas exiting the gas compressor to purify the exhaust gas exiting the gas compressor with an ion exchange system and to permit reuse of the water;
   a gas separation system to separate carbon dioxide and nitrogen from the exhaust gas existing the gas washing system for separate injection into the injection well; and
   a controller to monitor and sequence system operations.

3. The inert gas oil production system of claim 2, wherein the exhaust gas cooling system further comprises:
   a heat exchanger heated by exhaust gases;
   a cooling tower having a basin and a manifold; and
   a pump, the pump adapted to pump water from the basin of the cooling tower, through the heat exchanger, and out the manifold.

4. The inert gas oil production system of claim 3 in which the exhaust gas cooling system further comprises a makeup water supply system having a second pump, a pressure tank, and a float valve within the basin of cooling tower.

5. The inert gas oil production system of claim 4, wherein the exhaust gas is combusted from methane or propane from the engine being utilized by the inert gas oil production system.

6. The inert gas oil production system of claim 2, in which the exhaust gas washing system further comprises:
   a first washing stage fluid mixer;
   a second washing stage fluid mixer with a liquid-water separation chamber;
   an ion exchange resin tank to remove nitrogen oxides from washing water; and
   a water storage tank to supply produced water,
   wherein gas from the heat exchanger is compressed by the first stage compressor and mixed with water from the storage tank by the first washing stage fluid mixer, the liquid-gas mixture flowing out of the first washing stage fluid mixer and mixed with water from the water storage tank by the second washing stage fluid mixer, whereby the two stages of washing in the fluid mixers remove nitrogen oxides and water vapors, leaving carbon dioxide and nitrogen for subsequent injection into the reservoir.

7. The inert gas oil production system claim 6, further comprising a second controller adapted to regulate the amount of water entering the first and second washing stage fluid mixers.

8. The inert gas oil production system of claim 7, in which the inert gas from the second washing stage fluid mixer is routed to the gas separation system or to a compressor for injection into the injection well.

9. The inert gas oil production system of claim 8 wherein nitrogen oxides and the water from the second stage fluid mixer flow into the ion exchange storage tank, and into the water storage tank respectively.

10. The inert gas oil production system of claim 9, in which each of the first and second stage fluid mixers further comprise a radial-grooved ring mixer.

11. The inert gas oil production system of claim 10 in which each of the first and second stage fluid mixers comprises:
   an upper cylindrical donut housing with a fluid inlet, the upper cylindrical donut housing having a gas separation chamber to separate excess gases from liquids for discharging gas through a gas outlet on the upper housing;
   a grooved ring having a plurality of grooves, an impact zone being located below the grooved ring, the grooved ring being concentric to the upper cylindrical donut housing, the grooved ring having an outer diameter on a first end that is smaller than a diameter of the upper cylindrical donut housing, thus defining a distribution channel;
   an orifice ring adapted to inject gas in liquid leaving the grooves; and
   a cylinder concentric with the grooved ring, the cylinder in fluid communication with the distribution channel via the grooves, a saturated liquid outlet being located at a bottom of the cylinder.

12. The inert gas oil production system of claim 11, in which each fluid mixer has grooves that are radial.

13. The inert gas oil production system of claim 10, wherein the first stage fluid mixer further comprises a fluid inlet, a radial-groove ring, a distribution channel, radial grooves in the radial grooved ring with an impact zone, and orifices in an orifice plate over the radial grooves, the radial-grooved ring having an impact zone combined with a lower outlet.

14. The inert gas oil production system of claim 13, wherein flu gases from the first stage gas compressor enter the first stage fluid mixer through the inlet, around the distribution channel, and through the radial grooves to be mixed with the water entering from the orifices in the impact zone, the water entering the top housing and flowing through the orifices into the radial grooves to be mixed with the gases.

15. The inert gas oil production system of claim 14, wherein the gases become washed in the impact zone and the water and gases flow out of the first stage fluid mixer through the outlet.

16. The inert gas oil production system of claim 10, in which the second stage fluid mixer comprises a gas-water mixture inlet, a gas-water distribution channel, radial grooves, a water inlet port, a water distribution channel, water injection orifice ports, an impact zone, a lower cylinder with a water outlet, and a gas separation chamber with a gas outlet, wherein the gas-water mixture from the first washing stage fluid mixer enters the second washing stage fluid mixer through the gas-water mixture inlet and flows into the distribution channel, is divided into multi-streams and flows through the grooves where additional water is injected into each groove through the orifice ports over the grooves, and exits the grooves into the impact zone.

17. The inert gas oil production system of claim 2, in which the gas separation system further comprises:
   a high pressure compressor;
   a gas dryer to remove moisture from the gases;
   a gas separation membrane;
   a nitrogen gas compressor to increase the nitrogen gas pressure for subsequent injection into the injection well; and
   a carbon dioxide gas compressor to increase the carbon dioxide gas pressure for subsequent injection into the injection well, wherein, the inert gases of carbon dioxide and nitrogen flowing out of the second washing stage fluid mixer enter the high pressure compressor, pass through the gas dryer and the gas separation membranes, the membranes separating the carbon dioxide and nitrogen, the carbon dioxide entering the carbon dioxide gas compressor and the nitrogen passing to the nitrogen gas compressor.

18. The inert gas oil production system of claim 17 further comprising a second controller to selectively inject carbon dioxide or nitrogen into the injection well.

19. The inert gas oil production system of claim 17, in which the production system further comprises:
   an airlift crude oil pump in fluid communication with the reservoir via a production tube;
   an air supply in fluid communication with the reservoir via an air supply tube; and
   at least one packer to seal an annulus between the production tube, the air supply tube, and a casing in the well, wherein after inert gas from the nitrogen gas compressor is injected into the reservoir through an inert gas injection tube, the air supply injects air into the reservoir via the air supply tube and the airlift crude oil pump produces oil from the reservoir to surface via the production tube.

20. The inert gas oil production system of claim 19, wherein the production tube and the air supply tube are joined by a tee.

21. The inert gas oil production system of claim 1, in which the injection system further comprises:
   a compressor in fluid communication with the exhaust gas processing system to inject the gas exiting the exhaust gas process processing system into the injection well.

22. The inert gas oil production system of claim 21, in which the injection system further comprises:
   an injection pipe inserted inside an injection well casing above the reservoir, with at least one packer sealing an annulus between the casing and the injection pipe.

23. The inert gas oil production system of claim 1, further comprising:
   a water injection system to inject water into a water injection well, wherein the reservoir is a sloping underground formation, the gas injection well being down dip of the sloping underground formation, the water injection well being up dip of the sloping underground formation, and a production well being in fluid communication with the reservoir at a location on the sloping underground formation between the gas injection well and the water injection well.

24. The inert gas oil production system of claim 1, wherein the oil production system comprises a crude oil production pump.

25. The inert gas oil production system of claim 24, wherein the crude oil production pump comprises:
   an electric motor; and
   a hydraulically operated crude oil pump.

26. The inert gas oil production system of claim 25, in which the hydraulically operated crude oil pump further comprises:
   an upper pumping section having an upper diaphragm within an upper housing defining an upper space therebetween;
   a lower pumping section having a lower diaphragm within a lower housing defining a lower space therebetween;
   a hydraulic pump driven by the electric motor to pump hydraulic fluid from a hydraulic fluid reservoir;
   an crude oil inlet and a crude oil outlet, the upper and lower sections being in selective fluid communication with the crude oil inlet and crude oil outlet;
   a directional control valve in fluid communication with the upper pumping section and the lower pumping section, to selectively control the flow of hydraulic fluid between the upper pumping section and the lower pumping section,
   wherein the lower diaphragm moves downwardly against a force of a lower spring when hydraulic fluid flows into the lower space above the lower diaphragm in the lower section to pump crude oil from below the diaphragm in the lower section out of lower section housing, the upper diaphragm being adapted to move upwardly by a force of an upper spring to allow crude oil to enter the upper space in the upper section below the upper diaphragm when hydraulic fluid flows out of the upper section, thereby pumping crude oil into the crude oil inlet of the pump and out of the crude oil outlet to the surface.

27. The inert gas oil production system of claim 25, in which the hydraulically operated crude oil pump further comprises:
   an upper pumping section having an upper bladder within an upper housing defining an upper space therebetween;
   a lower pumping section having a lower bladder within a lower housing defining a lower space therebetween;
   a hydraulic pump driven by the electric motor to pump hydraulic fluid from a hydraulic fluid reservoir;
   a crude oil inlet and an oil outlet, the upper and lower spaces being in selective fluid communication with the crude oil inlet and crude oil outlet; and a directional control valve in fluid communication with the upper bladder and the lower bladder, to selectively control the flow of hydraulic fluid between the upper pumping section and the lower pumping section, wherein the upper bladder expands when hydraulic fluid flows inside the upper bladder to pump crude oil from the upper space through the crude oil outlet to surface, the upper bladder being adapted to contract to allow crude oil to enter the upper space from the crude oil inlet when hydraulic fluid flows into the lower bladder, and wherein the lower bladder expands when hydraulic fluid flows inside the lower bladder to pump crude oil from the lower space through the crude oil outlet to surface thereby pumping crude oil into the inlet of the pump and out of the crude oil outlet to the surface.

28. The inert gas oil production system of claim 27, wherein the hydraulically operated crude oil pump further comprises valving to selectively provide for fluid communication therethrough.

29. The inert gas oil production system of claim 28, wherein the directional control valve further comprises pilot valves connected to sense a pressure of the hydraulic fluid within the upper and lower bladder.

30. The inert gas oil production system of claim 29, wherein an upper perforated wall is within the upper bladder and a lower perforated wall is within the lower bladder.

31. The inert gas oil production system of claim 30, wherein the lower and upper bladders are comprised of elastomeric material.

32. The inert gas oil production system of claim 31, wherein the pump further comprises valving including one way ball valves to selectively allow crude oil to alternatively flow from the upper section and the lower section to the outlet.

33. The inert gas oil production system of claim 32, wherein an upper section of the housing comprises a pump cap, the pump cap being threaded to attach to a drill string to transport oil from the reservoir to the surface.

34. The inert gas oil production system of claim 27, wherein the hydraulically operated crude oil pump further comprises:
a double acting hydraulic cylinder between the upper pumping section and the lower pumping section, the double acting hydraulic cylinder having an upper piston in an upper cylinder in fluid communication with the upper bladder, a center piston in a center cylinder in fluid communication with the hydraulic fluid reservoir, and a lower piston in a lower cylinder in fluid communication with the lower bladder, each piston being interconnected, each cylinder having hydraulic fluid within; and
a hydraulic directional control valve to alternate flow of the hydraulic fluid above and below the center piston,
wherein the center piston moves upwardly within the center cylinder when hydraulic fluid from the hydraulic fluid reservoir is pumped in the center cylinder below the center piston, the upper piston moving upwardly with the center piston to force hydraulic fluid out of the upper cylinder above the upper piston and into the upper bladder to inflate the upper bladder, the lower piston moving upwardly with the center piston to force hydraulic fluid into the lower cylinder in an area below the lower piston, to deflate the lower bladder.

35. The inert gas oil production system of claim 34, wherein when the center piston moves downwardly within the center cylinder when hydraulic fluid from the hydraulic fluid reservoir is pumped in the center cylinder above the center piston, the lower piston moving downwardly with the center piston to force hydraulic fluid out of the lower cylinder below the lower piston and into the lower bladder to inflate the lower bladder, the upper piston moving downwardly with the center piston to force hydraulic fluid into the upper cylinder in an area above the upper piston, to deflate the upper bladder.

36. The inert gas oil production system of claim 35, wherein an area below the upper piston in the upper housing is filled with air and in fluid communication with an area above the lower piston in the lower housing.

37. The inert gas, oil production system of claim 1, in which the fuel gas generator further comprises:
a plurality of gas-extracting towers, each tower having an inner exhaust gas cylinder having a spiral baffle;
an intermediate cylinder circumscribing the inner exhaust gas cylinder, fins being interposed between the inner exhaust gas cylinder and the intermediate cylinder; and
an outer casing circumscribing the intermediate cylinder;
an exhaust gas inlet in fluid communication with the inner exhaust gas cylinder;
an exhaust gas outlet;
a crude oil inlet; and
a fuel gas outlet,
wherein, hot exhaust gases enter the fuel gas generator through the exhaust gas inlet and flows spiraling upwardly within the exhaust gas cylinder via the spiral baffle, to heat crude oil entering the plurality of gas-extracting towers through the crude oil inlet and flowing upwardly through an annulus between the exhaust gas cylinder and the intermediate cylinder, the heat of the exhaust gas separating gases from the crude oil, the gases from the crude oil exiting the plurality of towers via the fluid gas outlet,
heavier oil flowing down the plurality of towers between the intermediate cylinder and the outer casing and out of the crude oil outlet, the exhaust gas exiting the towers at the exhaust gas outlet.

38. The inert gas oil production system of claim 37, comprising,
a bypass providing fluid communication between the exhaust gas inlet and the exhaust gas outlet.

39. A method of for producing oil, comprising:
providing an inert gas oil production system, the inert gas oil production system having an exhaust gas processing system to purify exhaust gases before injection into an injection well, an injection system to deliver the purified exhaust gas from the exhaust gas processing system to a reservoir via the injection well, an oil production system to produce crude oil from the reservoir after the injection system delivers purified exhaust gas to the reservoir, and a fuel gas generator for extracting natural gas from the crude oil under production, the natural gas being useable as fuel for an engine utilized in the inert gas oil production system,
purifying exhaust gases with the exhaust gas processing system;
injecting the purified exhaust gas into an injection well;
producing crude oil from the reservoir; and
generating natural gas from the crude oil under production.

40. The method of claim 39, further comprising:
injecting water into a water injection well to block the flow of exhaust gas from the reservoir.

* * * * *